United States Patent
Nomura et al.

(10) Patent No.: US 6,717,744 B2
(45) Date of Patent: Apr. 6, 2004

(54) LENS BARREL

(75) Inventors: Hiroshi Nomura, Saitama (JP);
Takamitsu Sasaki, Saitama (JP);
Kazunori Ishizuka, Kanagawa (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/283,230

(22) Filed: Oct. 30, 2002

(65) Prior Publication Data

US 2003/0081327 A1 May 1, 2003

(30) Foreign Application Priority Data

Oct. 31, 2001 (JP) ........................................ 2001-335563

(51) Int. Cl.⁷ .............................................. G02B 15/14
(52) U.S. Cl. ........................................ 359/701; 359/700
(58) Field of Search ................................ 359/694, 696, 359/699, 700, 701, 823

(56) References Cited

U.S. PATENT DOCUMENTS

| | | | |
|---|---|---|---|
| 6,324,022 B1 | * 11/2001 | Yoshida | 359/823 |
| 6,456,445 B2 | 9/2002 | Nomura et al. | |
| 6,580,566 B1 | * 6/2003 | Kamoda | 359/701 |
| 6,597,518 B2 | * 7/2003 | Nomura et al. | 359/699 |
| 2001/0017735 A1 | * 8/2001 | Nomura et al. | 359/699 |
| 2001/0017736 A1 | * 8/2001 | Nomura et al. | 359/699 |
| 2003/0081325 A1 | * 5/2003 | Nomura et al. | 359/700 |
| 2003/0081948 A1 | * 5/2003 | Nomura et al. | 396/72 |

* cited by examiner

*Primary Examiner*—Ricky Mack
(74) *Attorney, Agent, or Firm*—Greenblum & Bernstein, P.L.C.

(57) ABSTRACT

A lens barrel includes front and rear lens group frames, and a cam ring having a cam groove including a front-lens-group accommodation portion, a rear-lens-group-accommodation portion having a straight connecting portion connected to the front-lens-group accommodation portion, and an end portion. The front lens group frame is linearly guided and the rear lens group frame is relatively rotatably supportable and linearly guidably supportable. Rotation of the rear lens group frame is allowed when first and second followers are positioned in the front and rear-lens-group accommodation portions. When the cam ring is rotated from the accommodation portions, upon the rear lens group frame being switched from the relatively rotatable state to the linearly guidable state, the second follower rotates together with the cam ring while the second follower is positioned in the rear-lens-group accommodation portion or in the vicinity of the straight connecting portion.

10 Claims, 32 Drawing Sheets

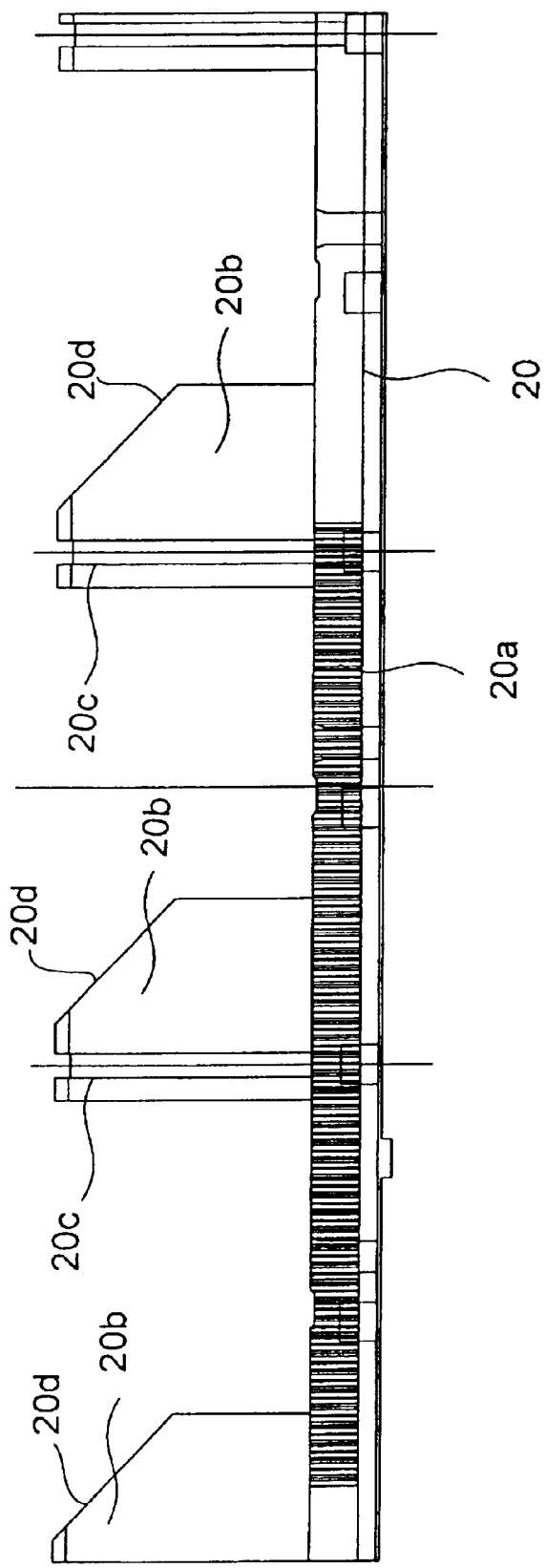

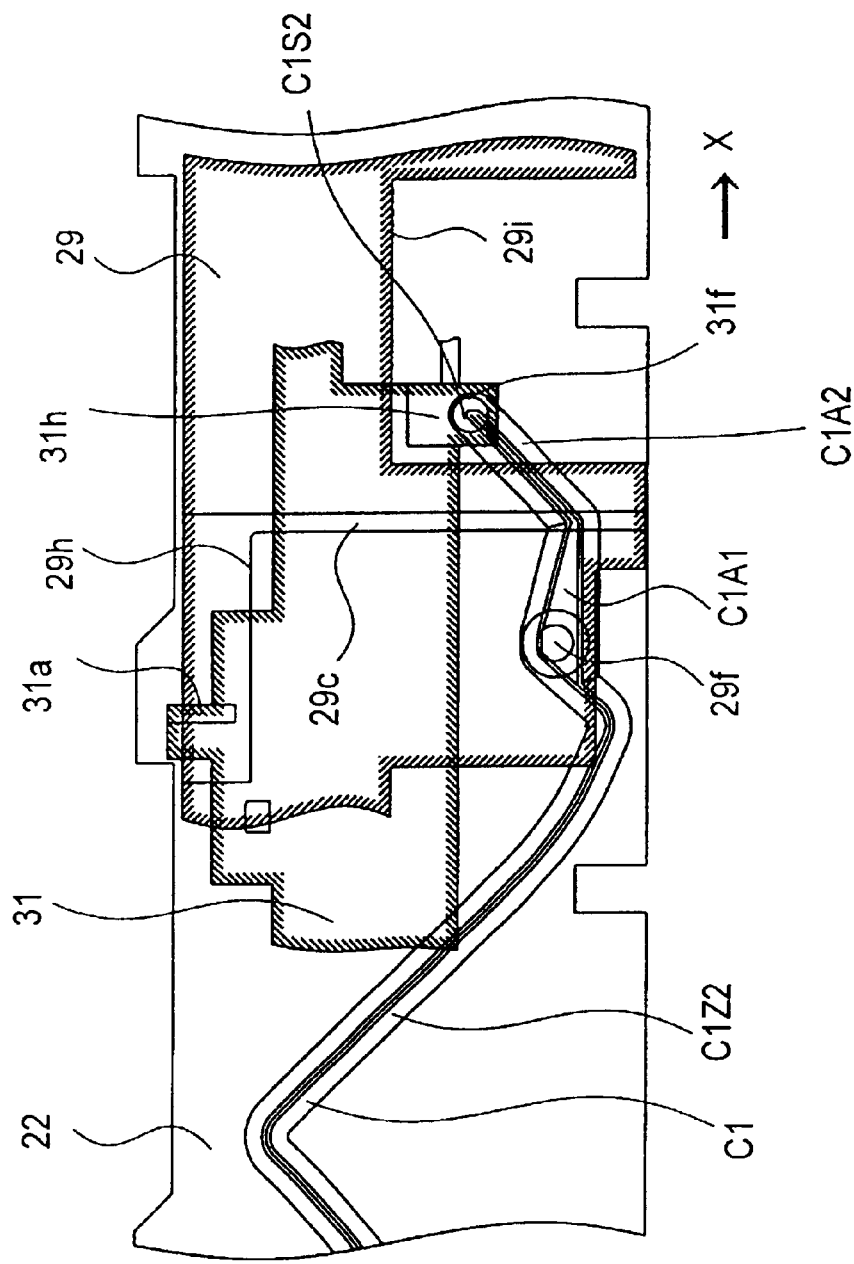

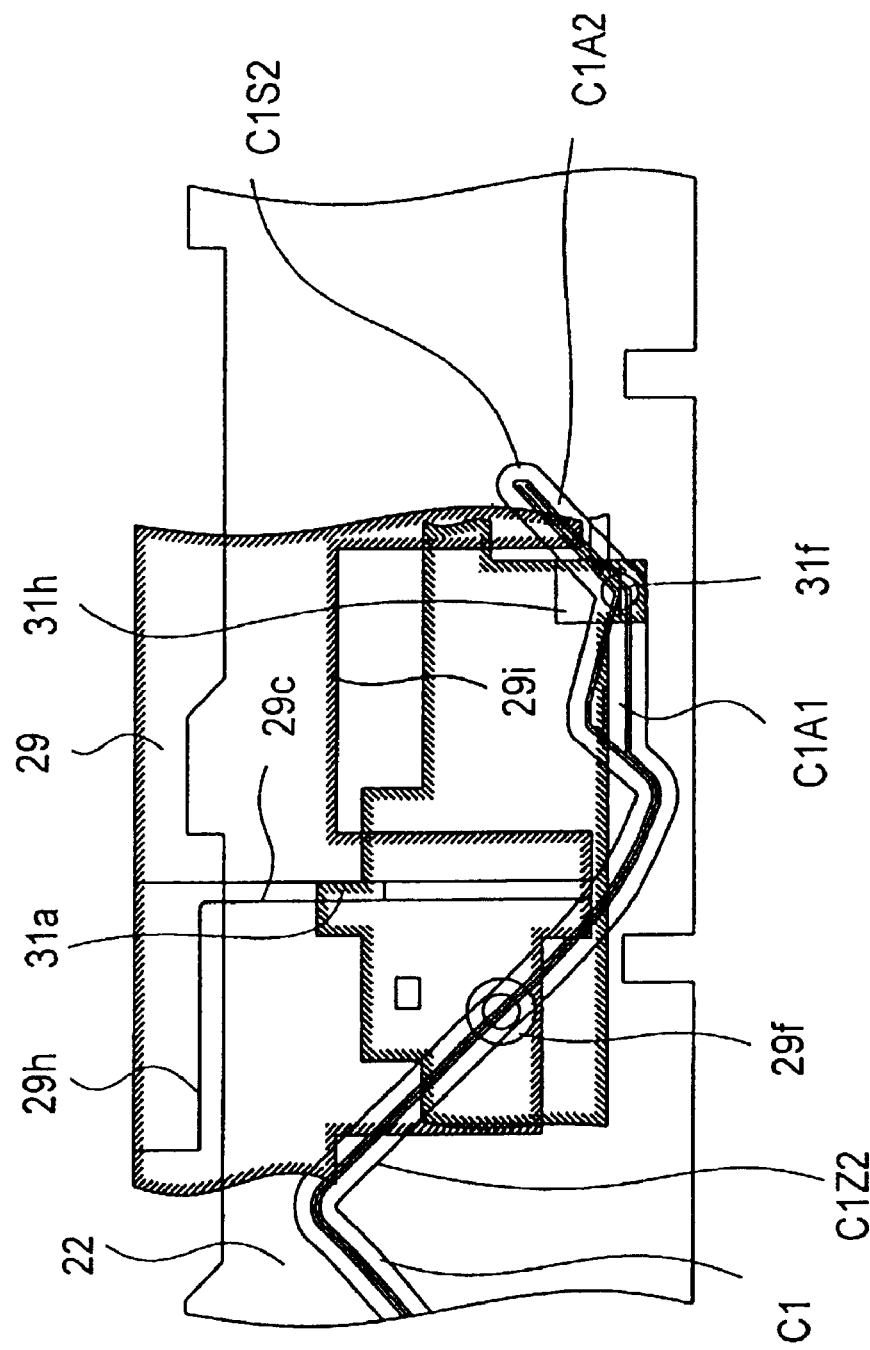

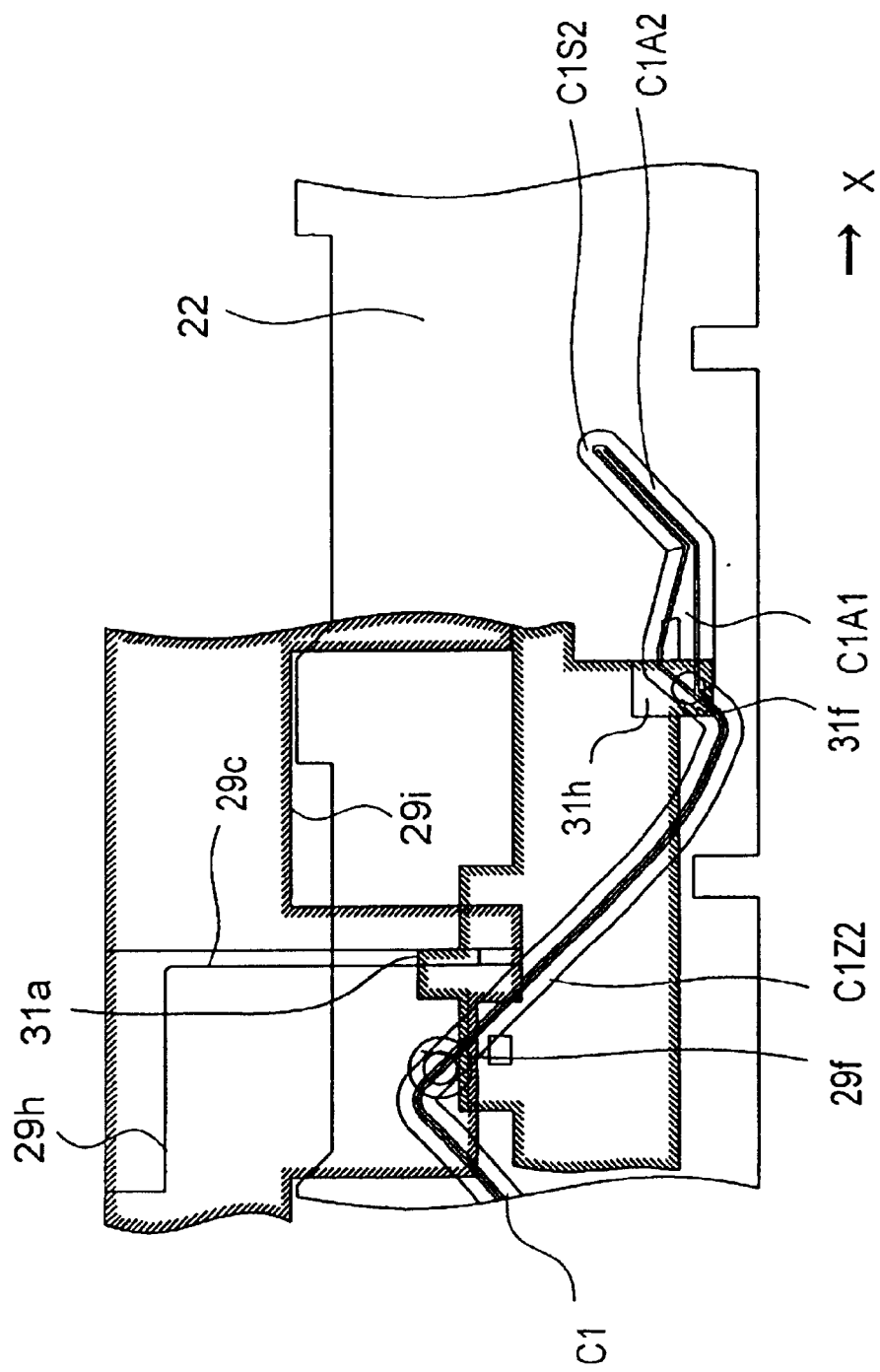

LENS BARREL

BACKGROUND OF THE INVENTION

1. Field of the Invention

The present invention relates to a lens barrel including a cam ring for moving lens groups in an optical axis direction.

2. Description of the Related Art

In a conventional lens barrel known in the art, in which each of linearly guided front and rear lens group frames is provided with a plurality of follower pins which are respectively engaged in a corresponding cam grooves formed on a rotating cam ring so that the linearly guided front and rear lens group frames move in an optical axis direction without rotating about the optical axis by rotation of the cam ring to move each of the front and rear lens group frames between an accommodation position and a photographing position in front of the accommodation.

However, if the angle of inclination of each cam groove relative to a circumferential direction of the cam ring (i.e., the pitch of each cam groove) is reduced to achieve a smooth movement of each lens group frame and if the length of each cam groove is increased to increase the maximum angle of rotation of the cam ring, the cam grooves for the first lens group frame and the cam grooves for the second lens group frame may interfere with each other.

SUMMARY OF THE INVENTION

The present invention provides an improved lens barrel wherein a large angle of rotation of a cam ring thereof can be secured even if cam grooves formed on the cam ring are shortened.

For example, a lens barrel includes an optical system including a front lens group and a rear lens group; a front lens frame which supports the front lens group, the front lens frame including a first cam follower and being guided linearly in an optical axis direction without rotating about the optical axis; a rear lens frame which supports the rear lens group and includes a second cam follower; and a cam ring which is driven to rotate about the optical axis and includes a cam groove in which the first cam follower and the second cam follower are engaged. The cam groove of the cam ring includes a front-lens-group accommodation portion which accommodates the first cam follower, and a rear-lens-group-accommodation portion which accommodates the second cam follower and is positioned closer to the front side of the cam ring than the front-lens-group accommodation portion, the front lens group and the rear lens group being positioned in respective accommodation positions thereof when the first cam follower and the second cam follower are engaged in the front-lens-group accommodation portion and the rear-lens-group-accommodation portion, respectively. One of the front lens frame and the rear lens frame includes a linear guide groove which extends parallel to the optical axis and a wide-width engaging portion which communicatively connects to a front end of the linear guide groove, the wide-width engaging portion having a greater width than the linear guide groove in a circumferential direction of the one of the front lens frame and the rear lens frame. The other of the front lens frame and the rear lens frame includes a linear guide projection which is selectively engaged in one of the linear guide groove and the wide-width engaging portion. The cam groove of the cam ring further includes a straight connecting portion formed so as to extend between the front-lens-group accommodation portion and the rear-lens-group-accommodation portion to extend linearly in a direction inclined with respect to both the optical axis and a circumferential direction of the cam ring, a width of the straight connecting portion being substantially the same as a diameter of the second cam follower. The rear-lens-group-accommodation portion is formed as a dead end of the cam groove which only allows the second cam follower to move toward the straight connecting portion therefrom. The linear guide projection is engaged in the wide-width engaging portion to thereby allow the rear lens frame to rotate with respect to the front lens frame when the front lens group and the rear lens group are positioned in the respective accommodation positions. If the cam ring rotates when the front lens group and the rear lens group are positioned in the respective accommodation positions, the second cam follower is rotated together with the cam ring, the second cam follower being positioned in one of the rear-lens-group-accommodation portion and the straight connecting portion in the vicinity of the rear-lens-group-accommodation portion when the linear guide projection reaches the front end of the linear guide groove from the wide-width engaging portion to be thereby prevented from rotating with respect to the front lens frame. The second cam follower is moved on a side edge of the straight connecting portion toward the front-lens-group accommodation portion so that the linear guide projection enters the linear guide groove to be properly engaged therein after the linear guide projection reaches the front end of the linear guide groove from the wide-width engaging portion.

It is desirable for the cam groove to include a moving section which is connected to one end portion of the front-lens-group accommodation portion on the side opposite from the straight connecting portion, the moving section being inclined in an opposite direction to the inclination direction of the straight connecting portion. When the second cam follower is moved rearward in the straight connecting portion so that the linear guide projection enters the linear guide groove, the first cam follower is moved forward in the moving section to move the front lens frame forward in the optical axis direction.

It is desirable for the cam groove to include a moving section for moving the first cam follower and the second cam follower to move the front lens frame and the rear lens frame in the optical axis direction, the moving section being connected to one end portion of the front-lens-group accommodation portion on the side opposite from the straight connecting portion. The moving section is curved to extend firstly rearward and subsequently forward, from the front-lens-group accommodation portion. The front lens frame presses the rear lens frame rearward to move the second cam follower from the rear-lens-group-accommodation portion to the straight connecting portion when the first cam follower moves rearward from the front-lens-group accommodation portion to the moving section by rotation of the cam ring. When the first cam follower subsequently moves forward in the moving section, the front lens frame presses the rear lens frame forward to move the second cam follower in the straight connecting portion back toward the rear-lens-group-accommodation portion, the linear guide projection reaching the front end of the linear guide groove from the wide-width engaging portion before the second cam follower reaches the rear-lens-group-accommodation portion.

It is desirable for the second follower pin to stay in the rear-lens-group-accommodation portion and rotate together with the cam ring without moving relative to the rear-lens-group-accommodation portion during the time the first cam follower moves from the front-lens-group accommodation portion to the moving section.

It is desirable for the wide-width engaging portion and the linear guide groove to be formed on an inner peripheral surface of the front lens frame. The linear guide projection is formed on an outer peripheral surface of the rear lens frame. A rear side edge of the wide-width engaging portion presses the linear guide projection forward when the first cam follower moves forward in the moving section.

The lens barrel can be a zoom lens barrel and the moving section can constitute a zooming section for moving the front lens group and the rear lens group to perform a zooming operation.

It is desirable for the front-lens-group accommodation portion to be shaped to allow the first cam follower to move in the optical axis direction in the front-lens-group accommodation portion by a predetermined amount of movement.

It is desirable for the front lens frame to include an inner flange for supporting the front lens group, a circumferential opening being formed on the inner flange. The rear lens frame can include a front projecting portion, on which the linear guide projection is formed, the front projecting portion projecting forward to extend through the inner flange through the circumferential opening when the rear lens frame is positioned in the vicinity of the accommodation position thereof.

According to another embodiment, a lens barrel is provided including an optical system including a front lens group and a rear lens group; a front lens frame which supports the front lens group, the front lens frame including a first cam follower and being guided linearly in an optical axis direction without rotating about the optical axis; a rear lens frame which supports the rear lens group and includes a second cam follower; and a cam ring which is driven to rotate about the optical axis and includes a cam groove in which the first cam follower and the second cam follower are engaged. The cam groove of the cam ring includes a front-lens-group accommodation portion which accommodates the first cam follower, and a rear-lens-group-accommodation portion which accommodates the second cam follower, the front lens group and the rear lens group being positioned in respective accommodation positions thereof when the first cam follower and the second cam follower are engaged in the front-lens-group accommodation portion and the rear-lens-group-accommodation portion, respectively. The cam groove further includes a straight connecting portion formed so as to extend between the front-lens-group accommodation portion and the rear-lens-group-accommodation portion to extend linearly in a direction inclined with respect to both the optical axis and a circumferential direction of the cam ring, a width of the straight connecting portion being substantially the same as a diameter of the second cam follower. The rear-lens-group-accommodation portion is formed as a dead end of the cam groove which only allows the second cam follower to move toward the straight connecting portion therefrom. One of the front lens frame and the rear lens frame includes a linear guide groove which extends parallel to the optical axis and a wide-width engaging portion which communicatively connects to a front end of the linear guide groove, the wide-width engaging portion having a greater width than the linear guide groove in a circumferential direction of the front lens frame and the rear lens frame. The other of the front lens frame and the rear lens frame includes a linear guide projection which is selectively engaged in one of the linear guide groove and the wide-width engaging portion. The second cam follower is positioned in the rear-lens-group-accommodation portion when the rear lens frame is positioned at one end of a rotational range thereof which is determined by an engagement of the linear guide projection with the wide-width engaging portion. The second cam follower is positioned in one of the rear-lens-group-accommodation portion and the straight connecting portion in the vicinity of the rear-lens-group-accommodation portion when the rear lens frame is positioned at the other end of the rotational range thereof.

The present disclosure relates to subject matter contained in Japanese Patent Application No.2001-335563 (filed on Oct. 31, 2001) which is expressly incorporated herein by reference in its entirety.

BRIEF DESCRIPTION OF THE DRAWINGS

The present invention will be described below in detail with reference to the accompanying drawings in which:

FIG. 17B is a developed view of an outer peripheral surface of the rotational ring;

FIGS. 21A through 21J are developed perspective diagrams of the cam ring, a first lens group moving frame and the second lens group moving frame which are associated with one another, showing their positional relationships, step by step, in the case where the cam ring rotates from the accommodation position to the wide-angle extremity;

DESCRIPTION OF THE PREFERRED EMBODIMENT

Figure 1:
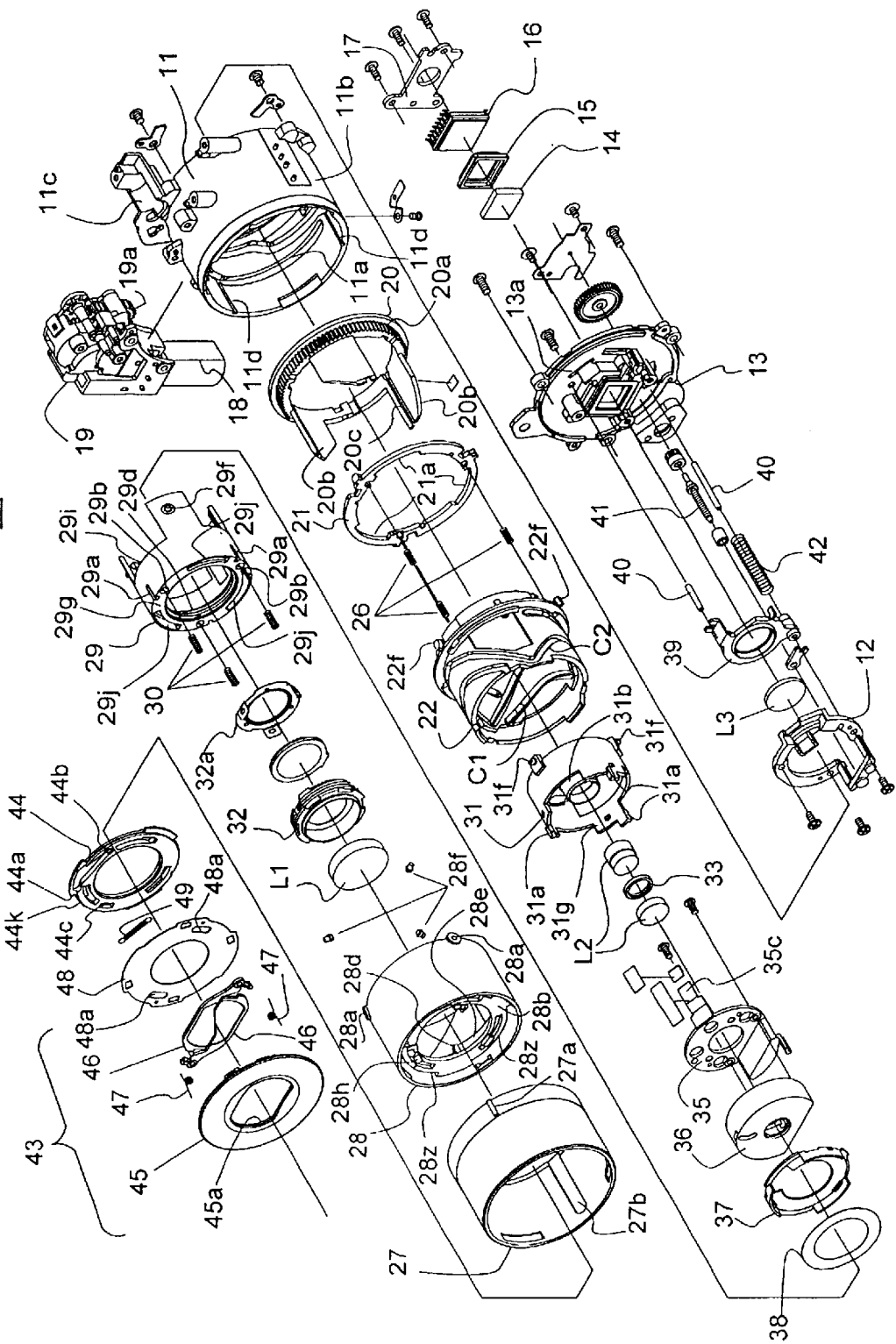
FIG. 1 is an exploded perspective view of an embodiment of a zoom lens barrel according to the present invention.

The illustrated embodiment of a zoom lens barrel, an exploded perspective view of which is shown in FIG. 1, is a telescoping zoom lens barrel of a digital camera.

Figure 8:
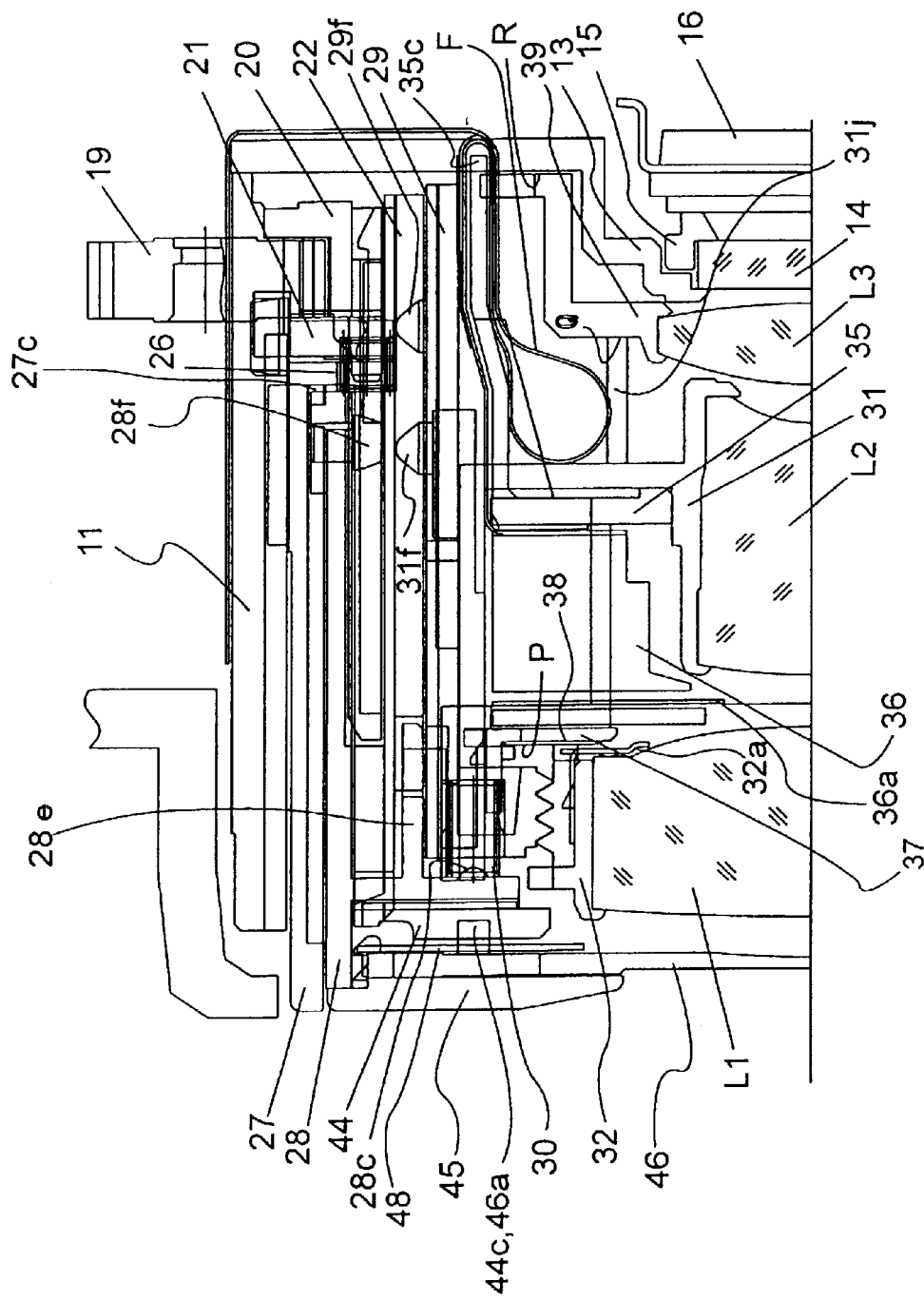
FIG. 8 is an axial cross sectional view of the zoom lens barrel shown in FIG. 1, above the optical axis, showing the zoom lens barrel in an accommodation position.
Figure 9:
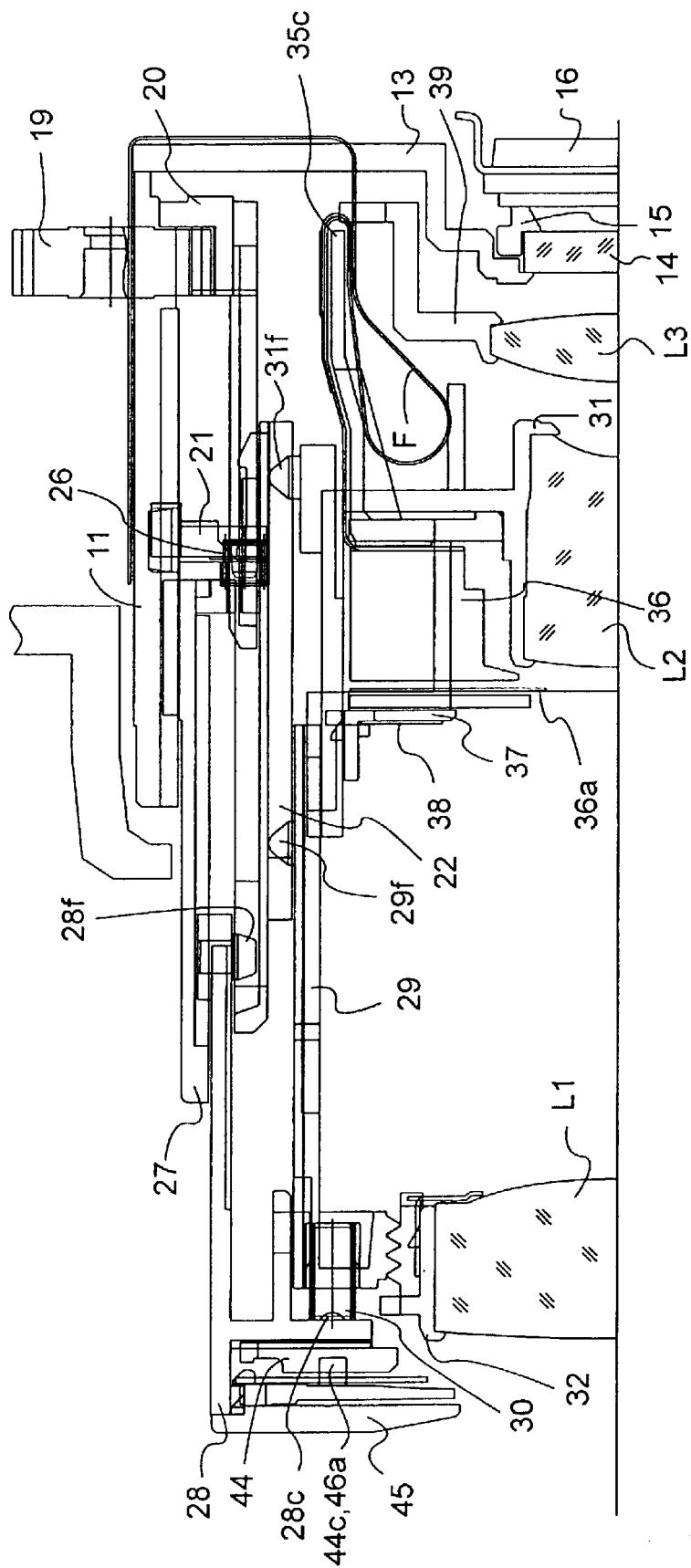
FIG. 9 is a view similar to that of FIG. 8, showing the zoom lens barrel in a wide-angle position.
Figure 10:
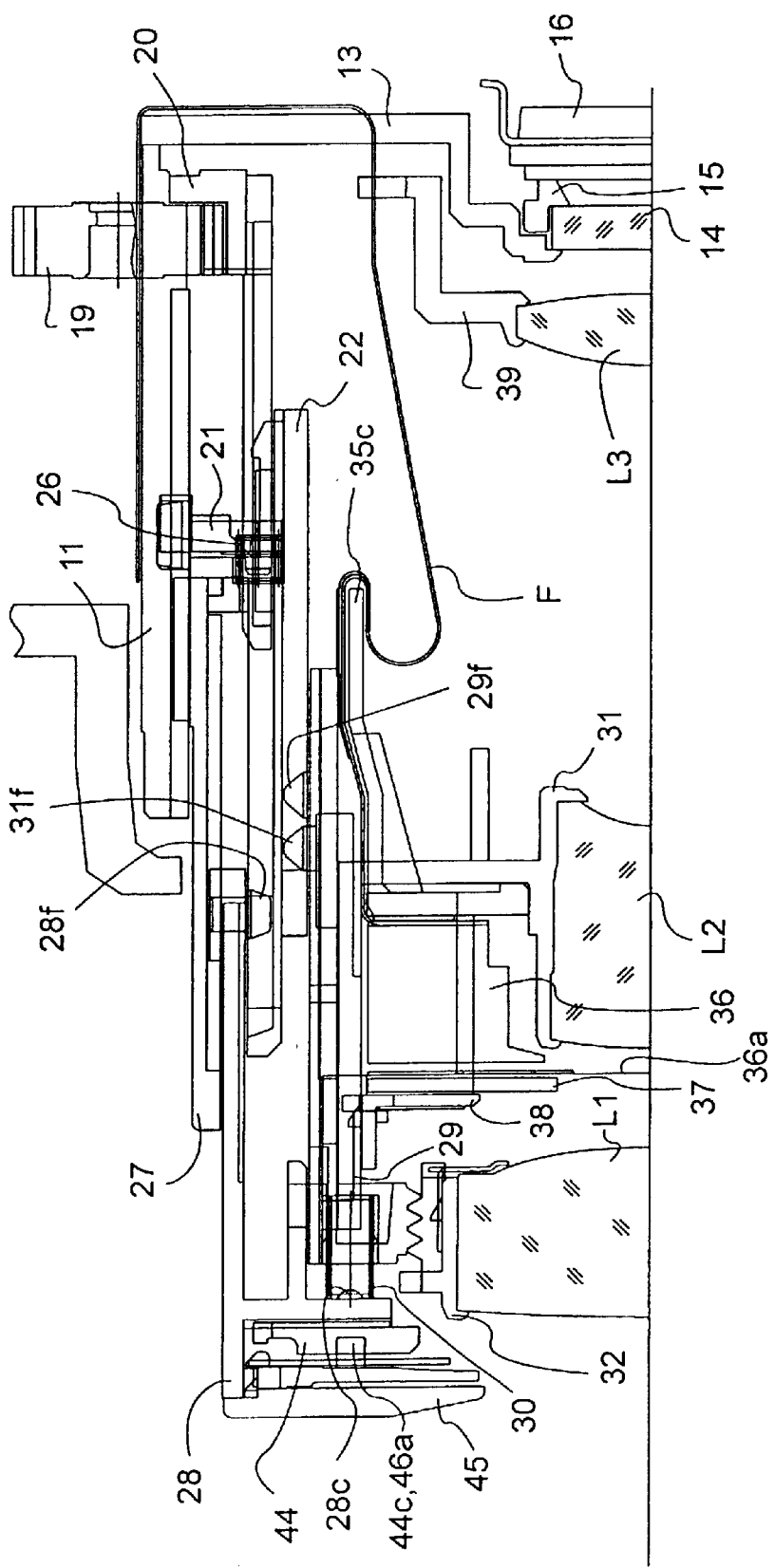
FIG. 10 is a view similar to that of FIG. 8, showing the zoom lens barrel in a telephoto position.

As can be clearly seen in FIGS. 8 through 10, the zoom lens barrel 10 is provided with a photographing optical system constructed of three lens groups: a first lens group (front lens group) L1, a second lens group (rear lens group) L2, and a third lens group L3, in that order from the object side (the left side as viewed in FIGS. 8 through 10). The first and second lens groups L1 and L2 are driven to move along an optical axis O relative to the third lens group L3 while varying the distance therebetween to perform a zooming operation. The third lens group L3 serves as a focusing lens group, and is driven to move along the optical axis O to perform a focusing operation.

Figure 3:
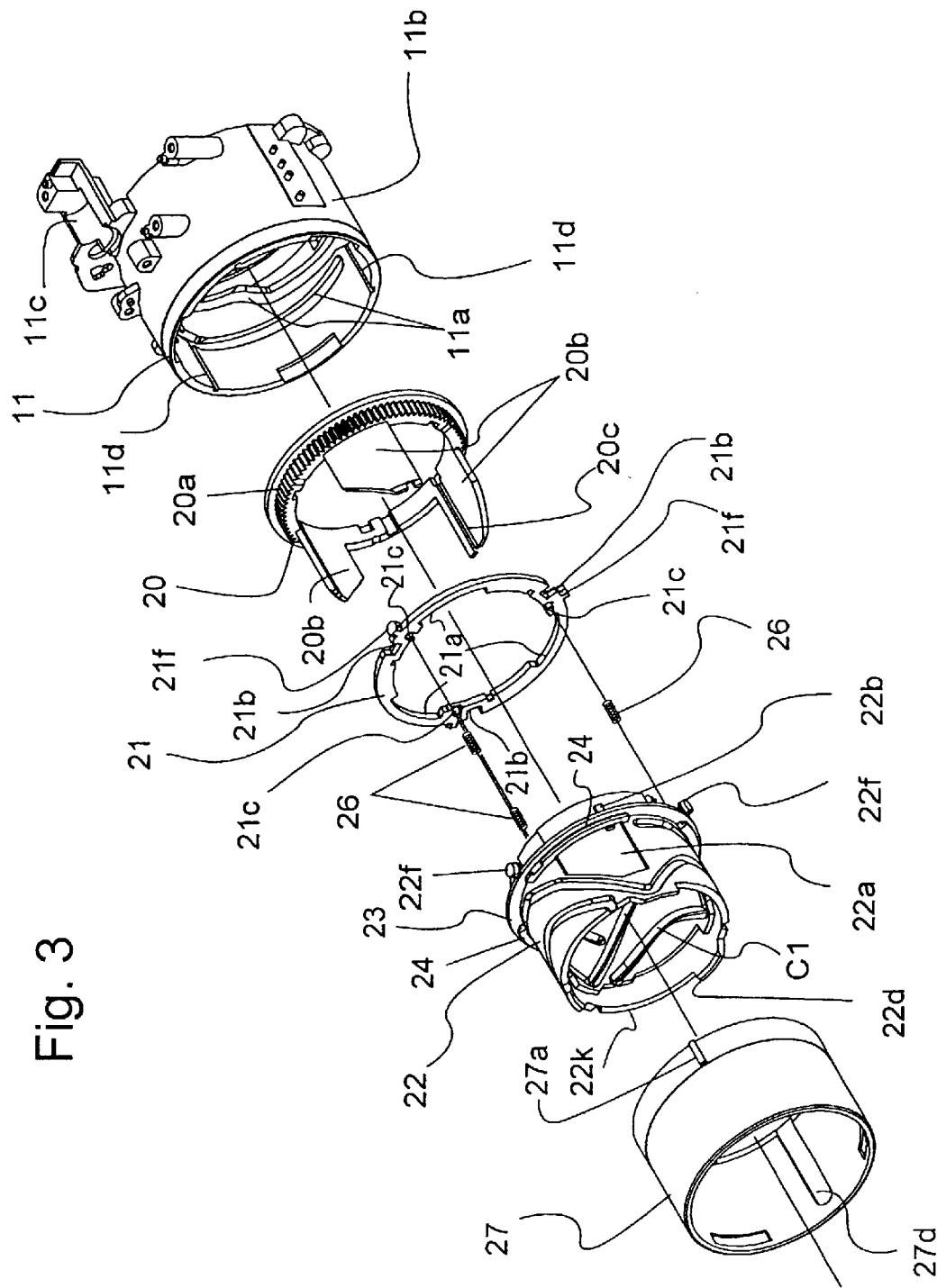
FIG. 3 is an exploded perspective view of another portion of the zoom lens barrel shown in FIG. 1.

As shown in FIG. 1, the zoom lens barrel 10 is provided with a stationary barrel 11, a shaft holding member 12, a CCD holding frame 13, a low-pass filter 14, a rectangular sealing member 15, a CCD 16 and a CCD pressure plate 17, which are all stationary members fixed to a camera body (not shown). Namely, none of these elements either move along an optical axis O (see FIGS. 8, 9 and 10) nor rotate about the optical axis O. The stationary barrel 11 is fixed to the camera body by set screws. As shown in FIGS. 1 and 3, the stationary barrel 11 is provided with an outer cylindrical portion 11b and a gutter-shaped gear holding portion 11c. Three cam grooves 11a are formed on an inner peripheral surface of the outer cylindrical portion 11b at equi-angular intervals (intervals of 120 degrees) in a circumferential direction of the stationary barrel 11. The outer cylindrical portion 11b is further provided on the inner peripheral surface thereof with three linear guide grooves 11d extending parallel to the optical axis O. Three linear guide keys 27a formed on a second ring (outer ring) 27 are respectively engaged in the three linear guide grooves 11d. The zoom lens barrel 10 is provided with a vertical motor 18 having a rotating shaft extending in a vertical direction of the camera (the vertical direction as viewed in FIG. 1). A drive gear 19a of a reduction gear train 19 engaged with the rotating shaft of the vertical motor 18 is mounted on the gear holding portion 11c to partly project into the inside of the stationary barrel 11 through a through hole (not shown) on an upper surface of the stationary barrel 11.

The low-pass filter 14, the sealing member 15 and the CCD 16 are fixed to the rear face of the CCD holding frame 13 with the CCD pressure plate 17.

The zoom lens barrel 10 is provided with a rotational ring 20 on which a circumferential gear portion 20a meshing with the drive gear 19a is formed. The rotational ring 20 is positioned in the rear of the stationary barrel 11 to be freely rotatable about the optical axis O without moving in the direction of the optical axis O (i.e., in the optical axis direction) with respect to the stationary barrel 11. Three rotation-transmission arms 20b project forwards from the rotational ring 20 at equi-angular intervals (intervals of 120 degrees) in a circumferential direction of the rotational ring 20. Each of the three rotation-transmission arms 20b is provided on an inner surface thereof with a rotation-transmission groove 20c extending parallel to the optical axis O.

Figure 11B:
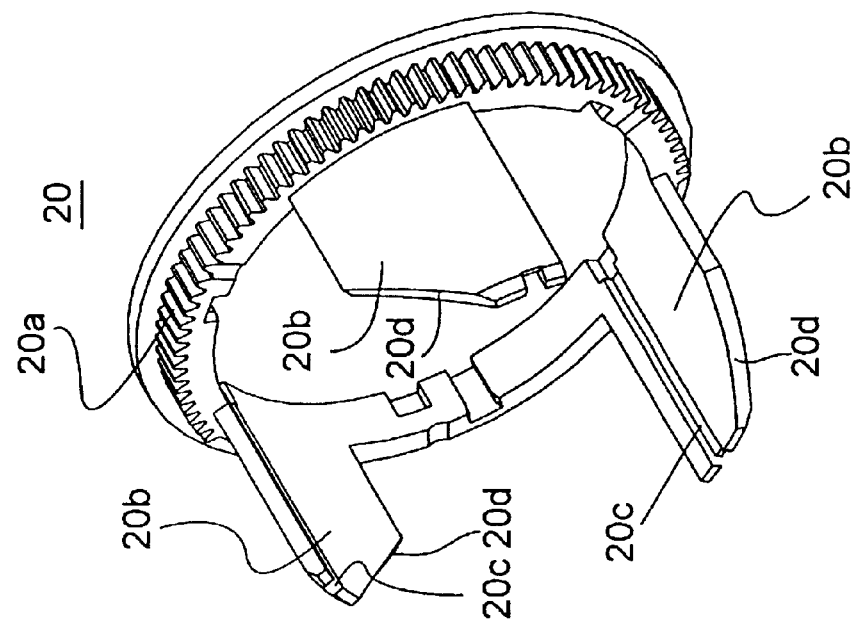
FIG. 11B is an enlarged perspective view of a rotational ring shown in FIG. 1.
Figure 11A:
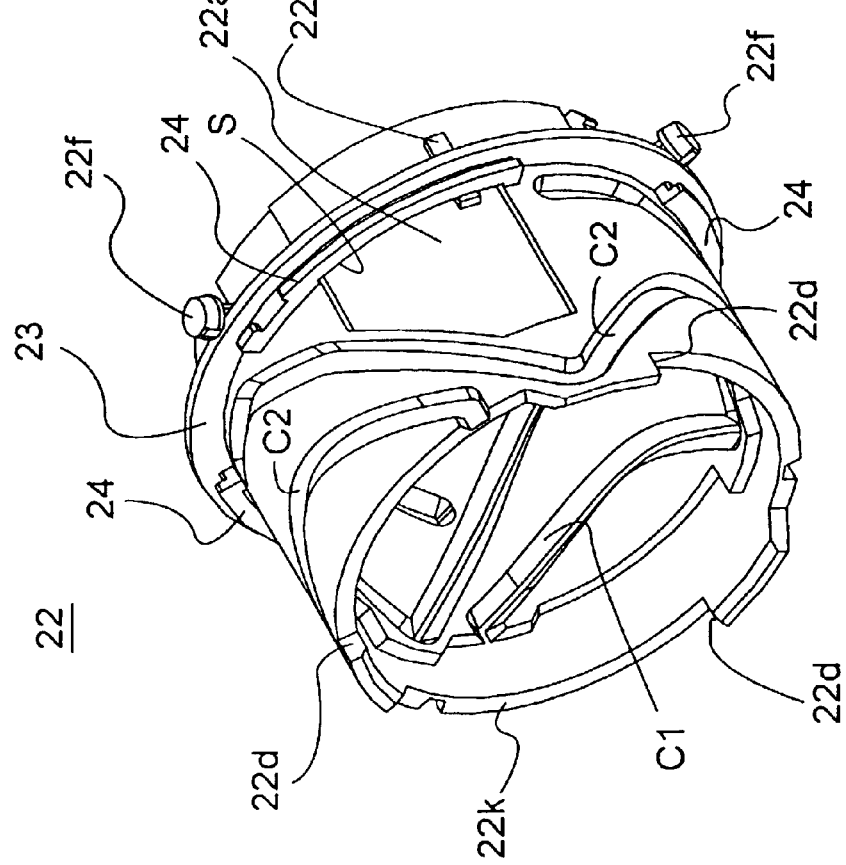
FIG. 11A is an enlarged perspective view of the cam ring.
Figure 14:
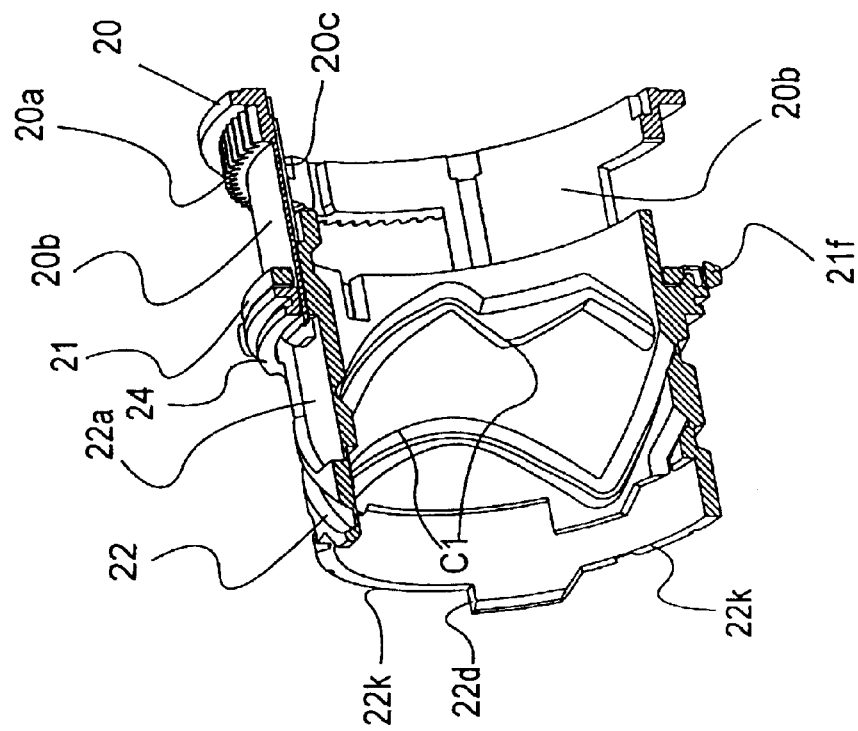
FIG. 14 is a cross sectional view of the cam ring, the rotational ring and the biasing ring.
Figure 15:
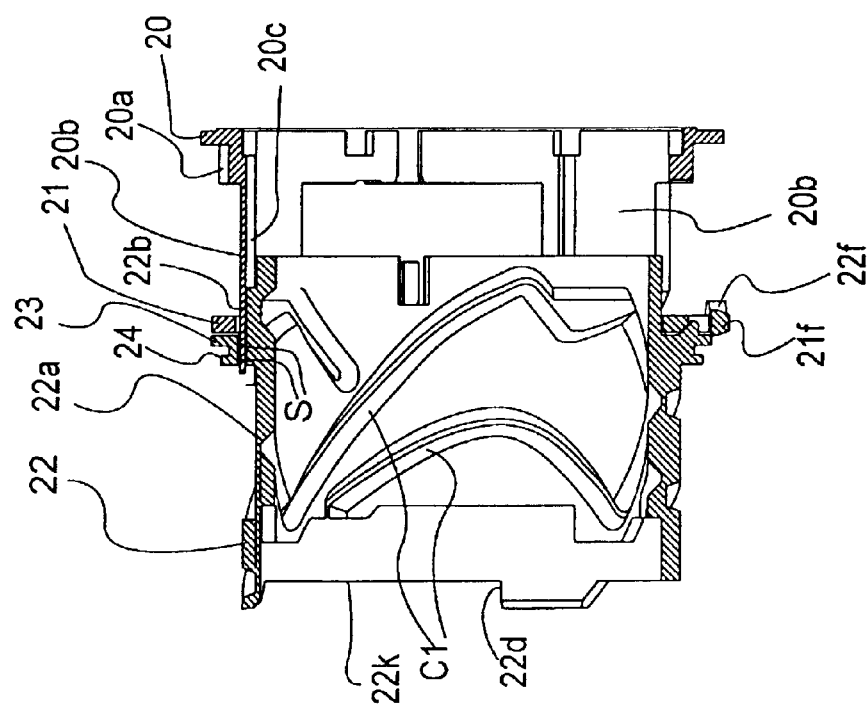
FIG. 15 is a perspective cross sectional view of the cam ring, the rotational ring and the biasing ring.

The zoom lens barrel 10 is provided in the stationary barrel 11 with a cam ring 22 positioned in front of the rotational ring 20. As shown in FIG. 11A, the cam ring 22 is provided, on an outer peripheral surface thereof in the rear end of the cam ring 22, with three bottomed engaging recesses 22a shaped to substantially correspond to the three rotation-transmission arms 20b. The rear end of each engaging recess 22a is formed as an open end. The radial depth of each engaging recess 22a is substantially the same as the radial thickness of each rotation-transmission arm 20b. The cam ring 22 is provided in the vicinity of the rear end thereof with an annular wall (outer flange) 23 projecting radially outwards from the cam ring 22. The cam ring 22 is provided on a front surface of the annular wall 23 with three bayonet prongs 24 each being elongated in a circumferential direction of the cam ring 22 and having an L-shaped cross section. The cam ring 22 is provided, between an inner surface of the annular wall 23 and the three engaging recesses 22a and between the three bayonet prongs 24 and the set of engaging recesses 22a, with three slots S (see FIG. 14) which penetrates therethrough in the optical axis direction so that the three rotation-transmission arms 20b are held between radial-bottom surfaces of the three engaging recesses 22a and the respective inner surfaces of the annular wall 23 in the three slots S to be movable in the optical axis direction with respect to the cam ring 22, respectively. Each slot S has an arc shape which extends in a circumferential direction as viewed from the front (or rear) of the zoom lens barrel 10. The cam ring 22 is provided in the three engaging recesses 22a with three guide keys 22b which extend in the optical axis direction to be slidably engaged with the three rotation-transmission grooves 20c, respectively. The cam ring 22 is provided, on an outer peripheral surface thereof at equi-angular intervals (intervals of 120 degrees) in a circumferential direction of the cam ring 22, with three follower pins 22f which extend radially outwards to be engaged in the three cam grooves 11a of the stationary barrel 11, respectively. The front-end portion of the guide key 22b is positioned in the slot S.

The three rotation-transmission arms 20b of the rotational ring 20 are slidably engaged in the three engaging recesses 22a to be freely movable in the optical axis direction with respect to the cam ring 22 with the three guide keys 22b being engaged in the three rotation-transmission grooves 20c, respectively. The three rotation-transmission arms 20b are respectively prevented from coming off the three engaging recesses 22a radially outwards by the annular wall 23, which is positioned radially outside the three engaging recesses 22a.

As shown in FIG. 3, the zoom lens barrel 10 is provided with a biasing ring 21 which is fitted on the rear end of the cam ring 22 to be positioned behind the annular wall 23. The biasing ring 21 is provided on an inner peripheral surface thereof with three recesses 21a in which the three rotation-transmission arms 20b are respectively inserted to be freely slidable in the optical axis direction. The biasing ring 21 is provided, on an outer peripheral surface thereof at equi-angular intervals (intervals of 120 degrees) in a circumferential direction of the biasing ring 21, with three recesses 21b. The biasing ring 21 is further provided, on an outer peripheral surface thereof at equi-angular intervals (intervals of 120 degrees) in a circumferential direction of the biasing ring 21, with three follower pins 21f in the close vicinity of the three recesses 21b, respectively. The three follower pins 22f of the cam ring 22 are engaged in the three recesses 21b.

The biasing ring 21 is provided, on a front surface thereof at equi-angular intervals (intervals of 120 degrees) in a circumferential direction of the biasing ring 21, with three spring-support projections 21c, and the cam ring 22 is provided in the rear thereof with three spring-support recesses (not shown) formed to correspond to the three spring-support projections 21c. One end of each of the three compression helical springs 26 are inserted into the three spring-support recesses while the other ends thereof are fitted on the three spring-support projections 21c so that the three compression helical springs 26 are held under compression between the three spring-support recesses and the biasing ring 21. Accordingly, the cam ring 22 is always biased toward the front of the optical axis direction, while the biasing ring 21 is biased toward the rear of the optical axis direction. Namely, the cam ring 22 and the biasing ring 21 are biased in opposite directions away from each other along the optical axis O by the three compression helical springs 26.

Figure 28:
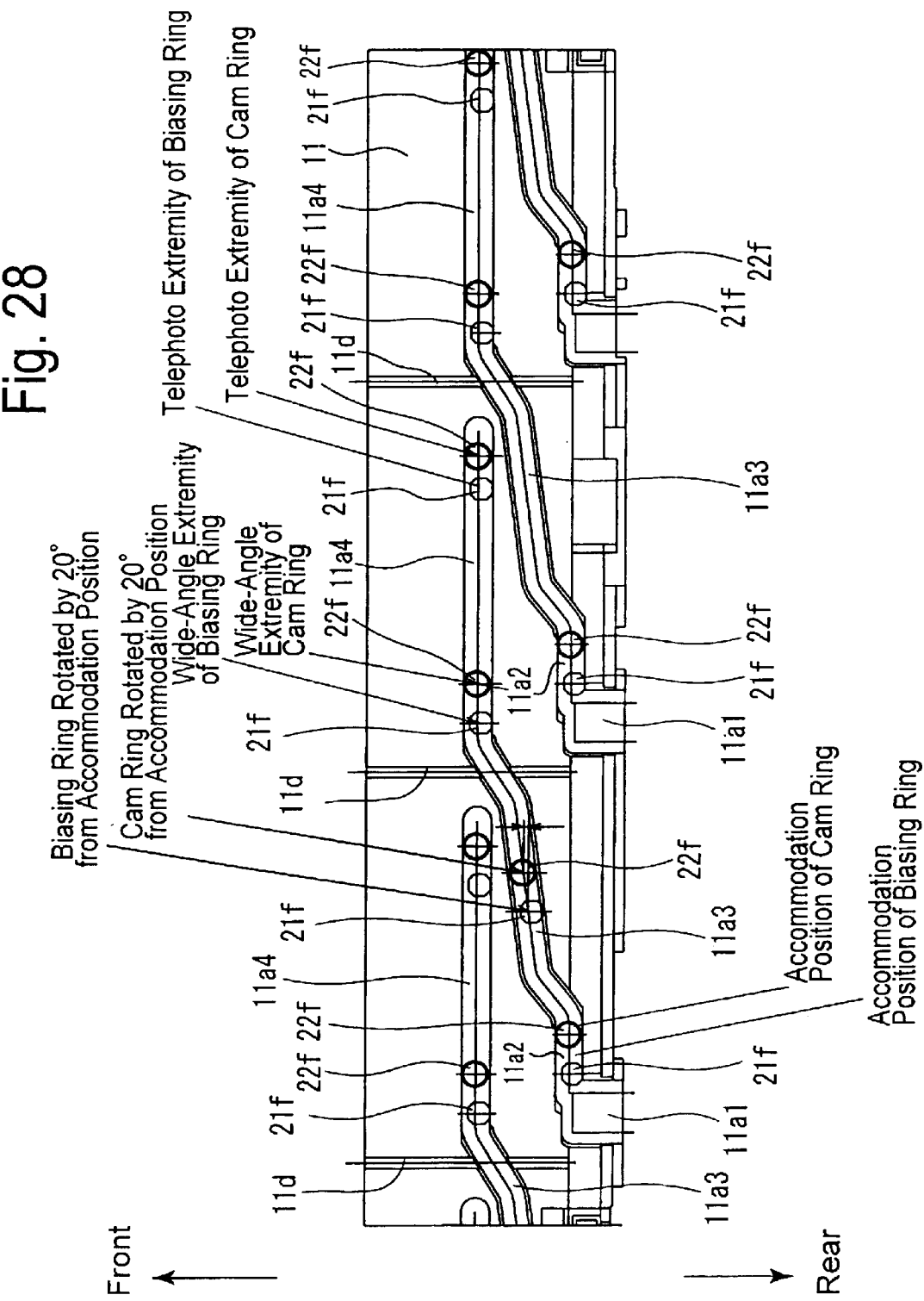
FIG. 28 is a developed view of an inner peripheral surface of a stationary barrel shown in FIG. 1.

As shown in FIG. 28, the three follower pins 21f of the biasing ring 21 and the three follower pins 22f of the cam ring 22 are engaged in the three cam grooves 11a of the stationary barrel 11 at different circumferential positions, respectively. Each cam groove 11a includes a linear groove portion 11a1, an accommodation groove portion 11a2, a position-changing groove portion 11a3 and a zooming groove portion 11a4. The linear groove portion 11a1 extends in the optical axis direction. The accommodation groove portion 11a2 extends in a circumferential direction of the cam ring 22. The position-changing groove portion 11a3 extends in a direction inclined with respect to both the optical axis O and a circumferential direction of the cam ring 22. The zooming groove portion 11a4 extends in a circumferential direction of the cam ring 22, i.e., extends parallel to the accommodation groove portion 11a2. The three follower pins 21f and the three follower pins 22f are inserted into the three cam grooves 11a via the linear groove portions 11a1 thereof, respectively.

In a state where the follower pins 21f and the follower pins 22f are respectively engaged in the accommodation groove portions 11a2 (i.e., in a state where the cam ring 22 is in an accommodation position/fully-retracted position), a forward rotation of the motor 18 causes the rotational ring 20 to rotate in a direction to extend the zoom lens barrel 10 relative to the stationary barrel 11. This causes the rotational ring 20 to transfer the rotational motion thereof to the cam ring 22 due to the engagement of the three guide keys 22b of the cam ring 22 in the three rotation-transmission grooves 20c of the rotational ring 20, respectively, so that the rotational ring 20, the biasing ring 21 and the cam ring 22 rotate together about the optical axis O. Further forward rotation of the motor 18 causes each follower pin 21f of the biasing ring 21 and each follower pin 22f of the cam ring 22 to move from the accommodation groove portion 11a2 to the position-changing groove portion 11a3, so that the cam ring 22 moves forward in the optical axis direction while rotating about the optical axis O. Further forward rotation of the motor 18 causes each follower pin 21f and each follower pin 22f to move from the position-changing groove portion 11a3 to the zooming groove portion 11a4, so that the cam ring 22 rotates about the optical axis O without further moving in the optical axis direction in accordance with the cam profile of the zooming groove portion 11a4.

Figure 13:
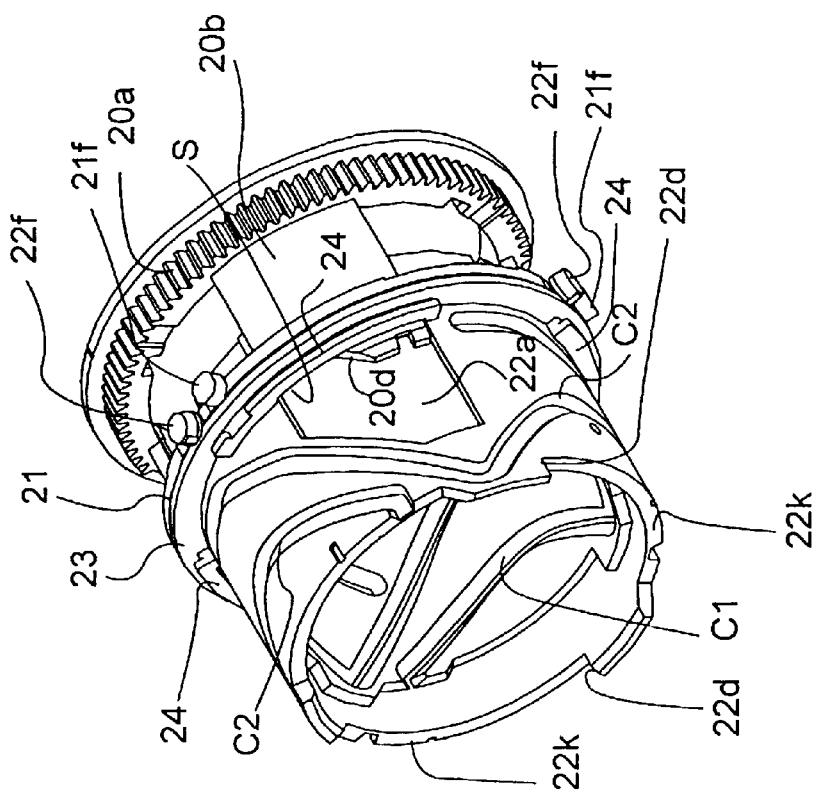
FIG. 13 is a view similar to that of FIG. 12, showing the cam ring, rotational ring and the biasing ring in a photographing position.
Figure 12:
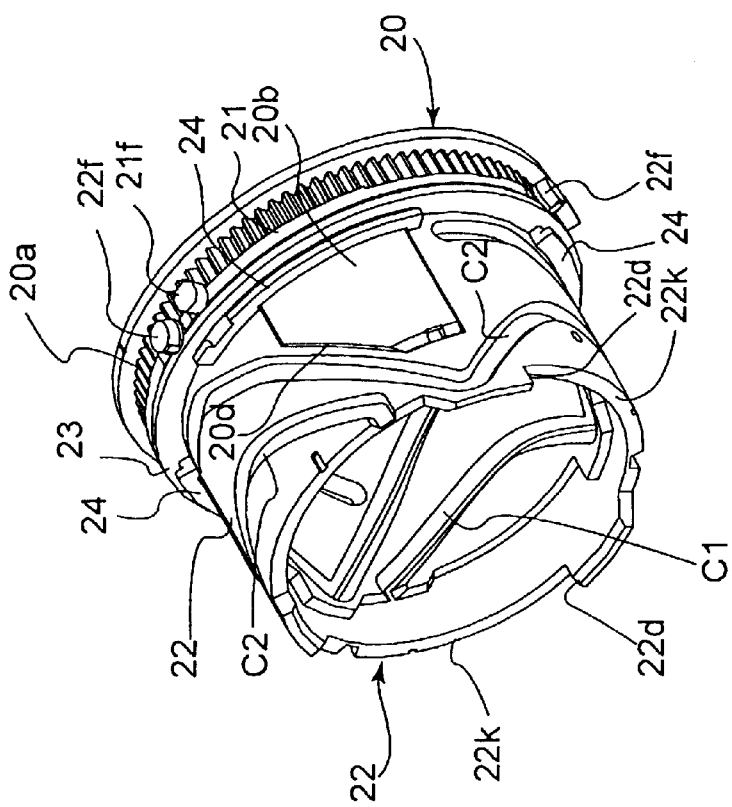
FIG. 12 is a perspective view of the cam ring, the rotational ring and a biasing ring fitted on the rear end of the cam ring in the accommodation position shown in FIG. 8.

As shown in FIG. 12, in a state where both the follower pins 21f and the follower pins 22f are engaged in the accommodation groove portions 11a2 (i.e., in a state where the cam ring 22 is in the accommodation position), the three rotation-transmission arms 20b are fully fitted (accommodated) in the three engaging recesses 22a with the front end surface of the circumferential gear portion 20a of the rotational ring 20 being in contact with the rear end surface of the biasing ring 21. In this state, the movement of the follower pins 21f and the follower pins 22f to the zooming groove portion 11a4 via the position-changing groove portion 11a3 causes the cam ring 22 and the biasing ring 21 to move together forwards to enter a photographing position as shown in FIG. 13, with the rotational ring 20 remaining in the rear of the stationary barrel 11.

Thereafter, a reverse rotation of the motor 18 causes the follower pins 21f and the follower pins 22f to move from the zooming groove portion 11a4 toward the accommodation groove portions 11a2, performing a movement reverse to the above-described movement. At the same time, the rotational ring 20, the biasing ring 21 and the cam ring 22 move from the photographing state shown in FIG. 13 to the accommodation position shown in FIG. 12.

In the present embodiment of the zoom lens barrel, the rotational ring 20, the biasing ring 21, the cam ring 22 and a barrier drive ring 44 are rotatable elements. The remaining movable elements, except for a second lens group moving frame (rear lens frame) 31, linearly move in the optical axis direction without rotating about the optical axis O. The second lens group moving frame 31 can slightly rotate about the optical axis O. Such linearly moving elements and linear guiding mechanisms thereof will be hereinafter discussed.

As shown in FIG. 8, the zoom lens barrel 10 is provided between the stationary barrel 11 and the cam ring 22 with the second ring 27 and a first ring (inner ring) 28 positioned in the second ring 27. The second ring 27, which is positioned just inside the stationary barrel 11, is provided, on an inner peripheral surface thereof at the rear end of the second ring 27, with three bayonet prongs 27c (only of which appears in FIG. 8) which are engaged with the three bayonet prongs 24 of the cam ring 22, respectively. Due to the engagement of the three bayonet prongs 27c with the three bayonet prongs 24, the second ring 27 is relatively rotatable about the optical axis O with respect to the cam ring 22, and does not relatively move in the optical axis direction with respect to the cam ring 22.

As shown in FIG. 1, the second ring 27 is provided, on an outer peripheral surface thereof at the rear end of the second ring 27, with the three linear guide keys 27a. The three linear guide keys 27a are formed on the second ring 27 at equi-angular intervals (intervals of 120 degrees) in a circumferential direction of the second ring 27 to be respectively engaged in the three linear guide grooves 11d. The second ring 27 is guided linearly in the optical axis direction without rotating about the optical axis O with respect to the stationary barrel 11 due to the engagement of the three linear guide keys 27a with the three linear guide grooves 11d.

The second ring 27 is provided, on an inner peripheral surface thereof at equi-angular intervals (intervals of 120 degrees) in a circumferential direction of the second ring 27, with three linear guide grooves 27b which extend parallel to the optical axis O. The first ring 28 is provided, on an outer peripheral surface thereof, at the rear end of the first ring 28 at equi-angular intervals (intervals of 120 degrees) in a circumferential direction of the first ring 28, with three cylindrical projections 28a which are engaged in the three linear guide grooves 27b, respectively. The first ring 28 is guided linearly in the optical axis direction without rotating about the optical axis O with respect to the second ring 27 due to the engagement of the three linear guide grooves 27b with the three cylindrical projections 28a. Each of the three cylindrical projections 28a is provided with a radial hole 28a into which a follower pin 28f (see FIGS. 8 through 10) is press-fitted.

The first ring 28 is provided in the vicinity of the front end thereof with an inner flange 28b which extends radially inwards and to which a barrier unit 43 and the barrier drive ring 44 are fixed. The first ring 28 is provided therein, on a rear surface of the inner flange 28b, with three guiding members 28e (only one of them is indicated in FIGS. 1 and 8) which extend in the optical axis direction. The zoom lens barrel 10 is provided with a first lens group moving frame (front lens frame) 29 which holds the first lens group L1 via a first lens group supporting frame 32. The first lens group moving frame 29 is positioned in the first ring 28 to be surrounded and supported by the three guiding members 28e to be slidably guided thereby in the optical axis direction. Specifically, the first lens group moving frame 29 is provided, on an outer peripheral surface thereof at the front end of the first lens group moving frame 29 at equi-angular intervals in a circumferential direction of the first lens group moving frame 29, with three linear guide grooves 29a which extend parallel to the optical axis O, and three linear guide keys 28d which are formed on inner surfaces of the three guiding members 28e to extend parallel to the optical axis O are slidably engaged in the three linear guide grooves 29a, respectively, so that the first lens group moving frame 29 is guided linearly in the optical axis direction without rotating about the optical axis O by the first ring 28.

Figure 24:
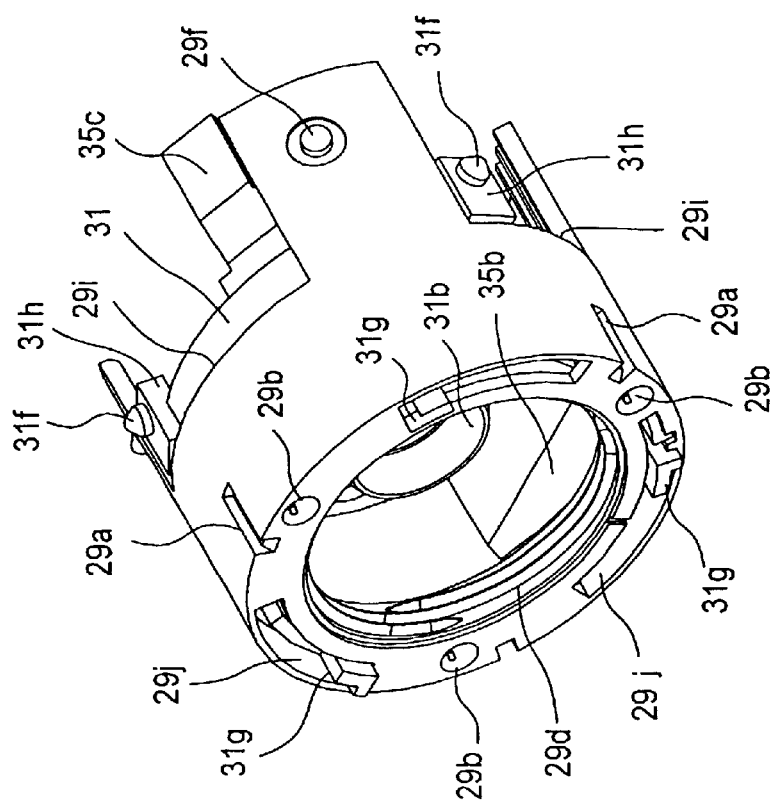
FIG. 24 is a perspective view of the first lens group moving frame and the second lens group moving frame fitted in the first lens group moving frame in the accommodation position shown in FIG. 8.
Figure 25:
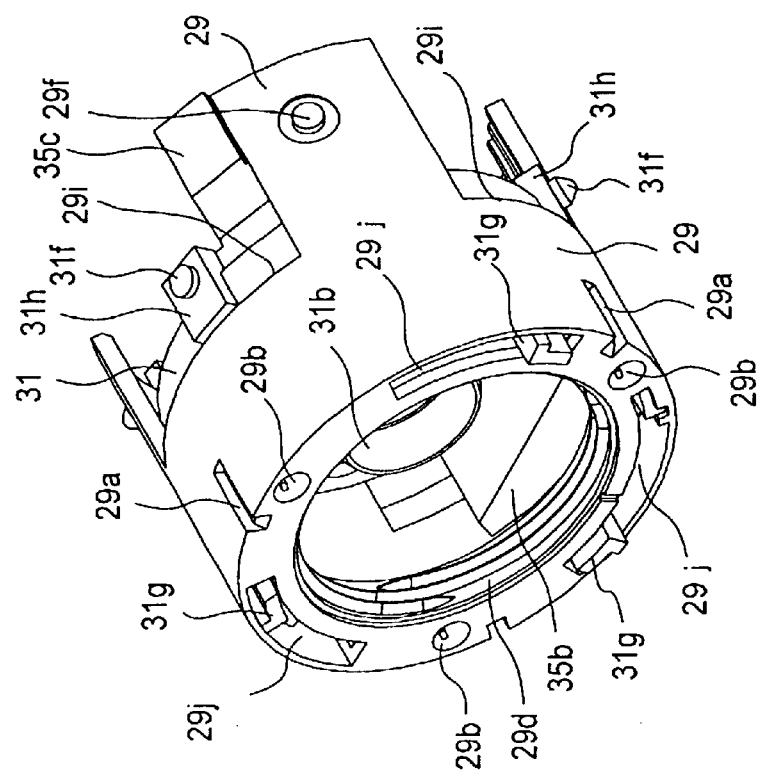
FIG. 25 is a view similar to that of FIG. 24, showing a state where three linear guide keys of the second lens group moving frame and corresponding three linear guide grooves of four linear guide grooves of the first lens group moving frame are aligned in the optical axis direction of the zoom lens barrel so that the three linear guide keys can be engaged in the corresponding three linear guide keys, respectively.
Figure 26:
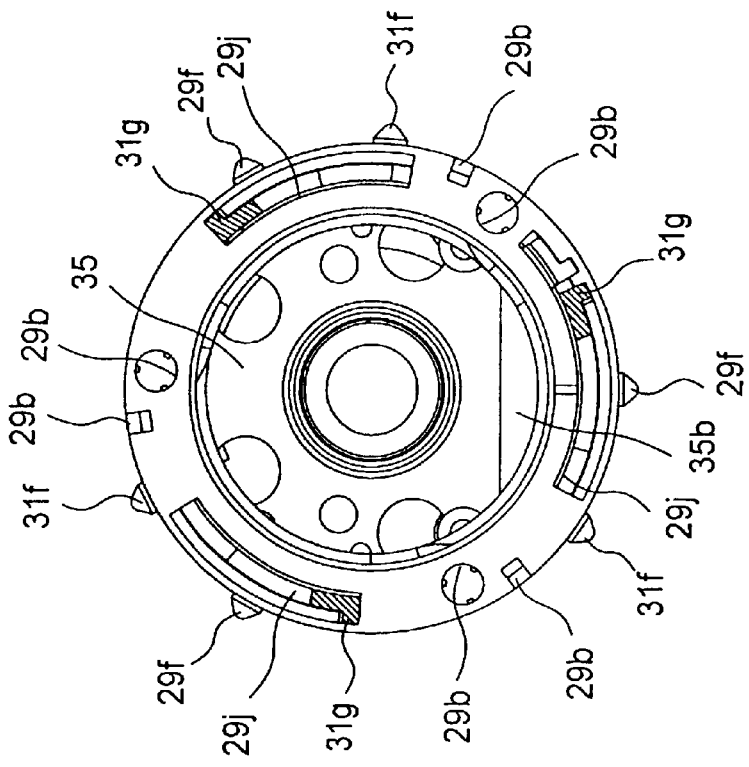
FIG. 26 is a front elevational view of the first lens group moving frame and the second lens group moving frame fitted in the first lens group moving frame in the accommodation position shown in FIG. 8.
Figure 27:
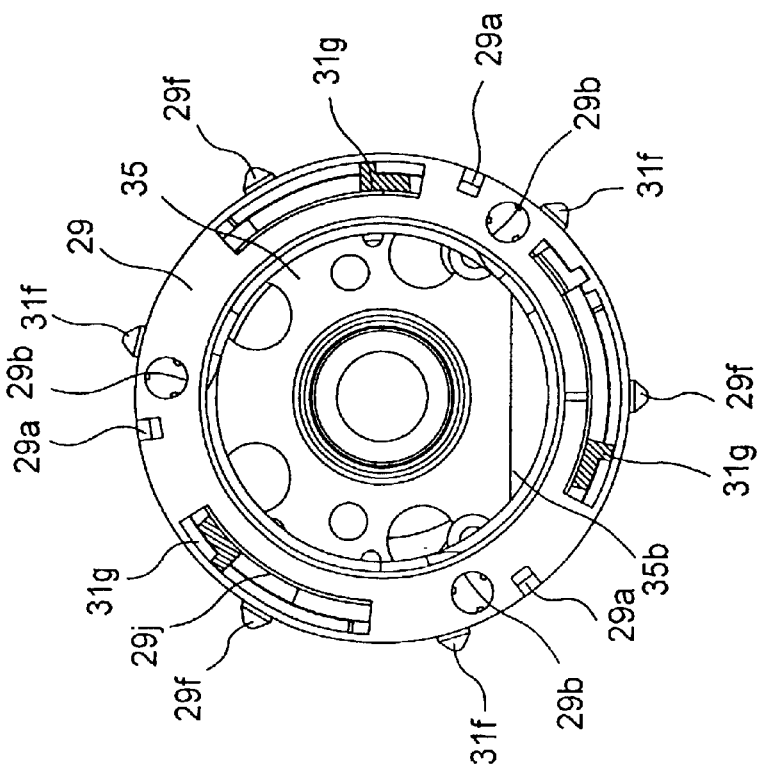
FIG. 27 is a view similar to that of FIG. 26, showing a state where the three linear guide keys of the second lens group moving frame and the corresponding three linear guide grooves of the four linear guide grooves of the first lens group moving frame are aligned in the optical axis direction of the zoom lens barrel so that the three linear guide keys can be engaged in the corresponding three linear guide keys, respectively.

The inner flange 28b of the first ring 28 is provided on a rear face thereof, at equi-angular intervals (intervals of 120 degrees) in a circumferential direction of the first ring 28, with three spring-support protrusions 28c (see FIGS. 8 through 10), and the first lens group moving frame 29 is provided, on a front end surface thereof at positions thereon facing the set of spring support protrusions 28c, with three spring-support recesses 29b which are formed at equi-angular intervals in a circumferential direction of the first lens group moving frame 29. Three helical compression springs 30 serving as a biasing device are inserted to be held between the three spring-support protrusions 28c and the three spring-support recesses 29b, respectively, to press the first lens group moving frame 29 rearwards in the optical axis direction. The first lens group moving frame 29 is provided at the rear end thereof with three cutout portions 29i in which three engaging projections 31h formed on an outer peripheral surface of the second lens group moving frame 31 at the rear end thereof are positioned, respectively (see FIG. 24).

The second lens group moving frame 31 that supports the second lens group L2 is fitted in the first lens group moving frame 29. The second lens group moving frame 31 is provided, on an outer peripheral surface thereof at the front end of the outer peripheral surface, with three linear guide keys (linear guide projections) 31a (see FIGS. 1 and 2) which are slidably engaged in three linear guide grooves of four linear guide grooves 29c (only one of them appears in each of FIGS. 21A through 21J) which are formed on an inner peripheral surface of the first lens group moving frame 29 to extend parallel to the optical axis O. Due to the engagement of the three linear guide keys 31a with the three linear guide grooves 29c, the second lens group moving frame 31 is guided linearly without rotating about the optical axis O by the first lens group moving frame 29.

As can be understood from the above description, according to the above described linear guiding mechanisms, the second ring 27 is guided linearly in the optical axis direction without rotating about the optical axis O via the stationary barrel 11, the first ring 28 is guided linearly in the optical axis direction without rotating about the optical axis O via the second ring 27, the first lens group moving frame 29 is guided linearly in the optical axis direction without rotating about the optical axis O via the first ring 28, and the second lens group moving frame 31 is guided linearly in the optical axis direction without rotating about the optical axis O via the first lens group moving frame 29, in that order from the outside to the inside of the zoom lens barrel 10.

The first lens group moving frame 29 is provided at the front end thereof with an inner flange 29g which extends radially inwards to form a circular aperture having the center thereof about the optical axis O. As shown in FIG. 1, a female thread portion 29d is formed on an inner peripheral face of the inner flange 29g. A lens pressure ring 32a is fixed to the rear end surface of the first lens group supporting frame 32 that holds the first lens group L1. The first lens group supporting frame 32 is provided on an outer peripheral surface thereof with a male thread portion which is in mesh with the female thread portion 29d of the inner flange 29g. The first lens group supporting frame 32 is cemented to the first lens group moving frame 29 by adhesive after the thread engagement position of the male thread portion of the first lens group supporting frame 32 with respect to the female thread portion 29d of the inner flange 29g has been adjusted during assembly.

Figure 2:
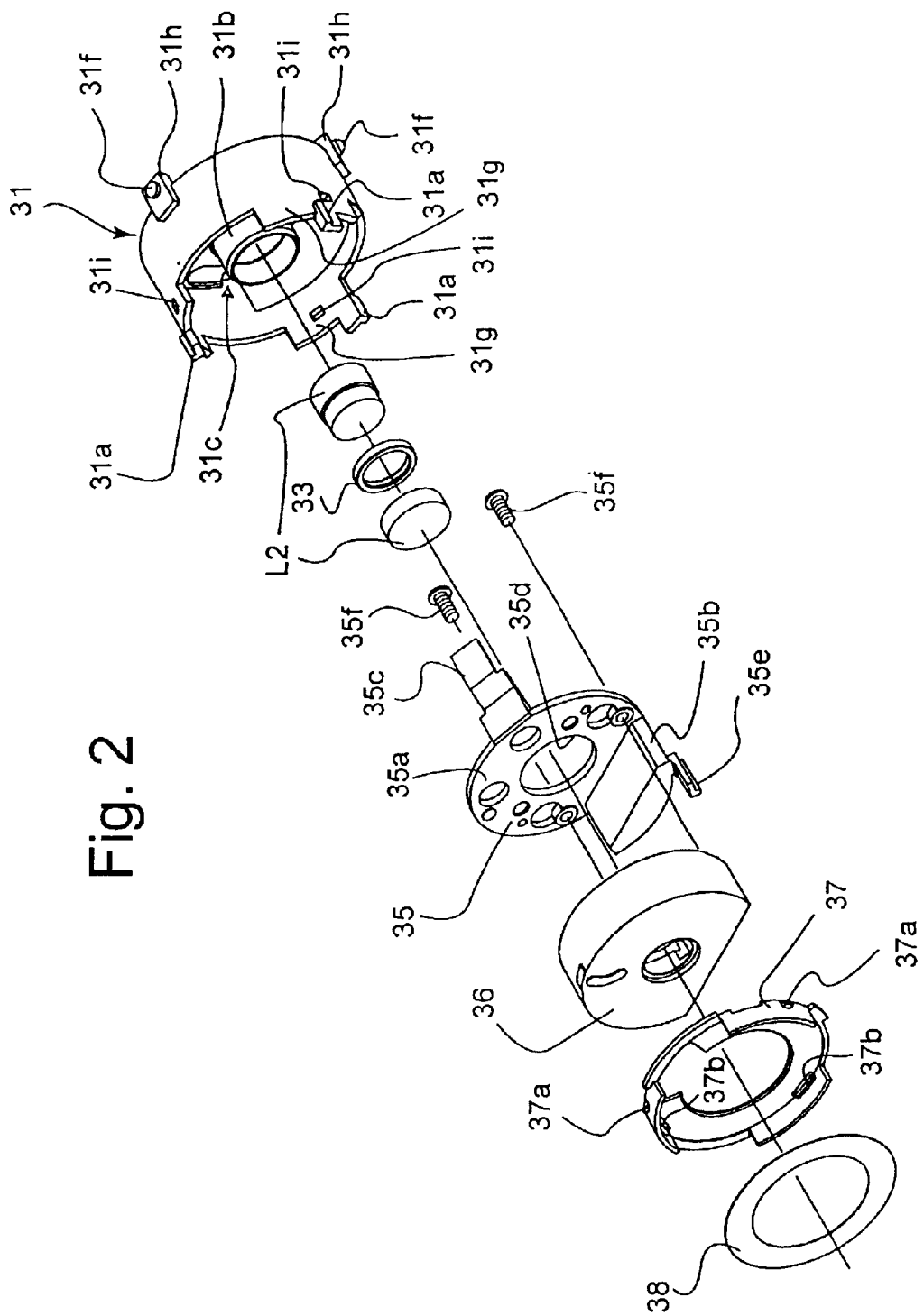
FIG. 2 is an exploded perspective view of a portion of the zoom lens barrel shown in FIG. 1.
Figure 5:
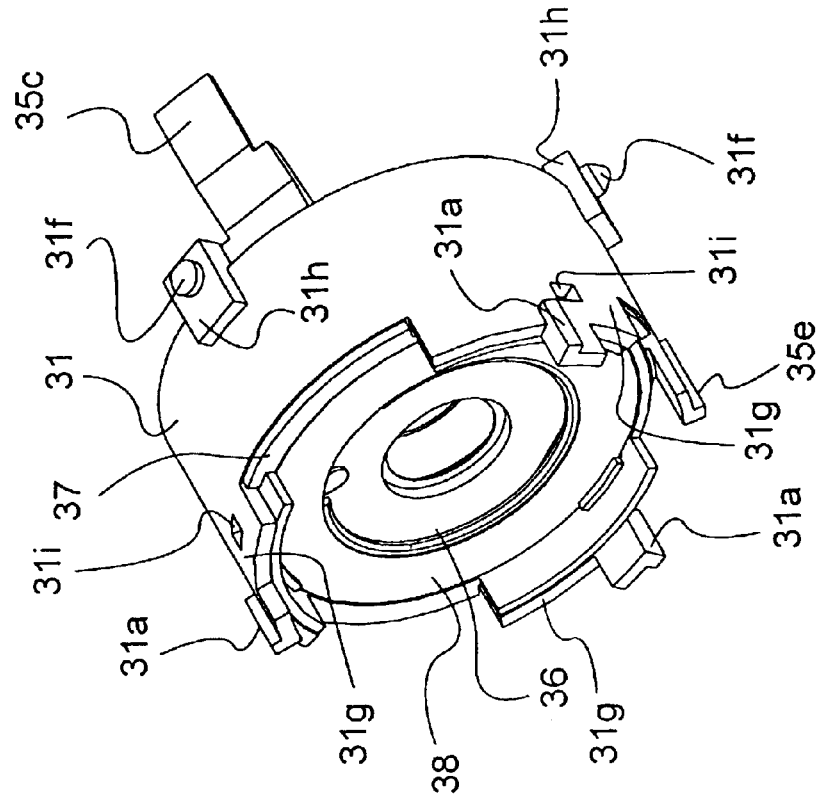
FIG. 5 is a perspective view of the second lens group moving frame and the shutter unit fixed to the second lens group moving frame, which are shown in FIG. 1, as viewed obliquely from rear of the second lens group moving frame.
Figure 7:
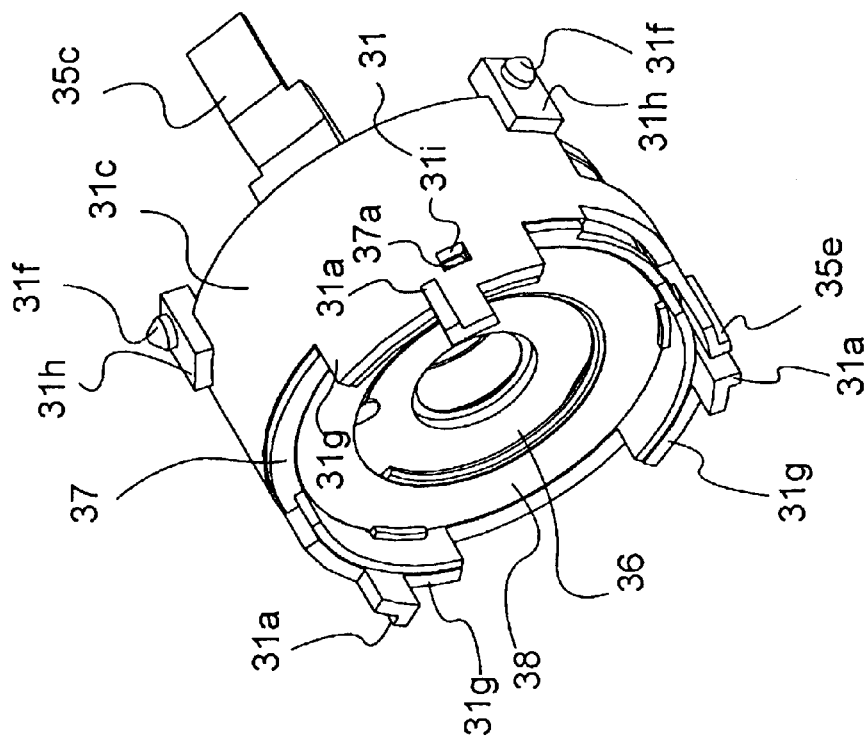
FIG. 7 is a view similar to that of FIG. 5, showing a position where the second lens group moving frame has rotated by a predetermined amount of rotation with respect to the shutter unit from the position shown in FIG. 5.

As shown in FIG. 2, the second lens group moving frame 31 is provided on a rear end wall thereof, at the center of the rear end wall, with a cylindrical portion 31b, the front and rear ends thereof being open. An annular recess 31c is formed between an outer circumferential wall of the second lens group moving frame 31 and the cylindrical portion 31b. As shown in FIGS. 1 and 2, the second lens group L2 consists of two separate lens elements, a spacer ring 33 being positioned therebetween. The two lens elements of the second lens group L2 together with the spacer ring 33 are fitted in the cylindrical portion 31b to be fixed therein. As shown in FIGS. 5 and 7, the second lens group moving frame 31 is provided on the rear end wall thereof with a first cutout portion 31d in the shape of an arc, and is provided, across the outer circumferential wall and the rear end wall of the second lens group moving frame 31, with a second cutout portion 31e which is larger than the first cutout portion 31d.

The zoom lens barrel 10 is provided in the annular recess 31c of the second lens group moving frame 31 with a shutter unit 36. As shown in FIG. 2, a shutter support ring 35, positioned between the shutter unit 36 and the second lens group moving frame 31, is provided on a front surface of a ring portion 35a thereof with a support member 35b which projects forward from the ring portion 35a to support the shutter unit 36. The shutter support ring 35 is provided on a rear surface of the ring portion 35a with a flexible printed wiring board (flexible FWB) fixing member 35c which extends rearward from the ring portion 35a. The shutter support ring 35 is provided at the center of the ring portion 35a with a circular aperture 35d in which the cylindrical portion 31b is fitted. The shutter support ring 35 is loosely fitted in the annular recess 31c to be freely rotatable about the optical axis O with respect to the second lens group moving frame 31 with the cylindrical portion 31b being fitted in the circular aperture 35d and with the flexible FWB fixing member 35c extending through the rear end wall of the second lens group moving frame 31 through the first cutout portion 31d. As shown in FIG. 2, the shutter support ring 35 is provided on the support member 35b with a linear guide key 35e extending parallel to the optical axis O. The linear guide key 35e is engaged in one of the four linear guide grooves 29c, in which the linear guide key 31a which is not engaged, to be freely and slidably movable therein in the optical axis direction. Accordingly, the shutter support ring 35 is not rotatable about the optical axis O since the first lens group moving frame 29 is not rotatable about the optical axis O either.

The shutter unit 36 is mounted on the support member 35b, and is fixed to the support member 35b by two set screws 35f as shown in FIG. 2.

Figure 4:
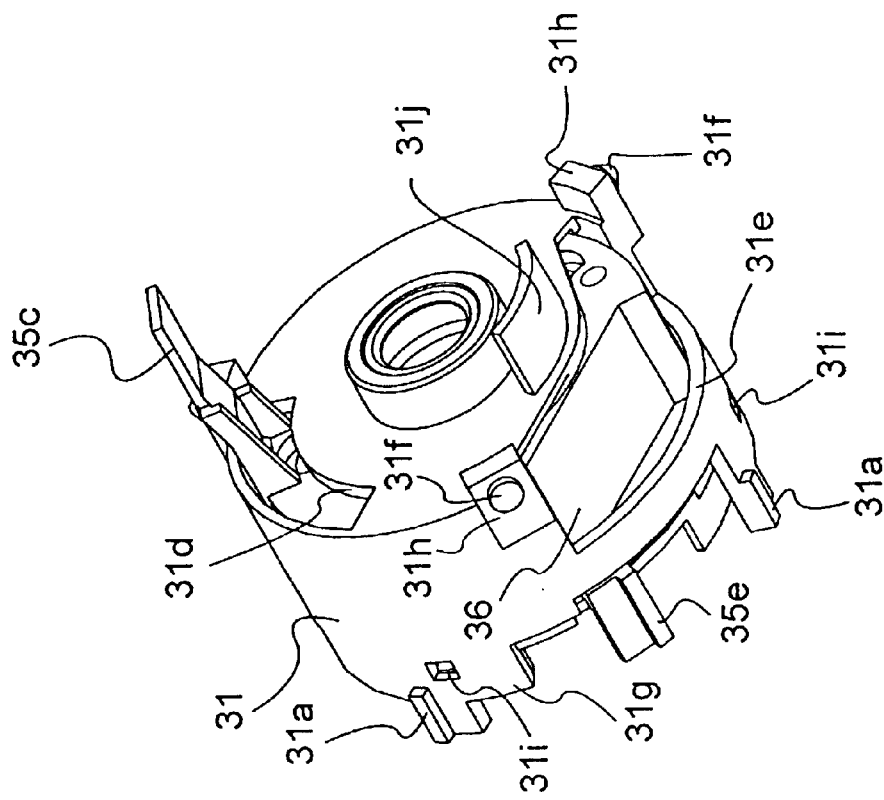
FIG. 4 is a perspective view of a second lens group moving frame and a shutter unit fixed to the second lens group moving frame, which are shown in FIG. 1, as viewed obliquely from front of the second lens group moving frame.
Figure 6:
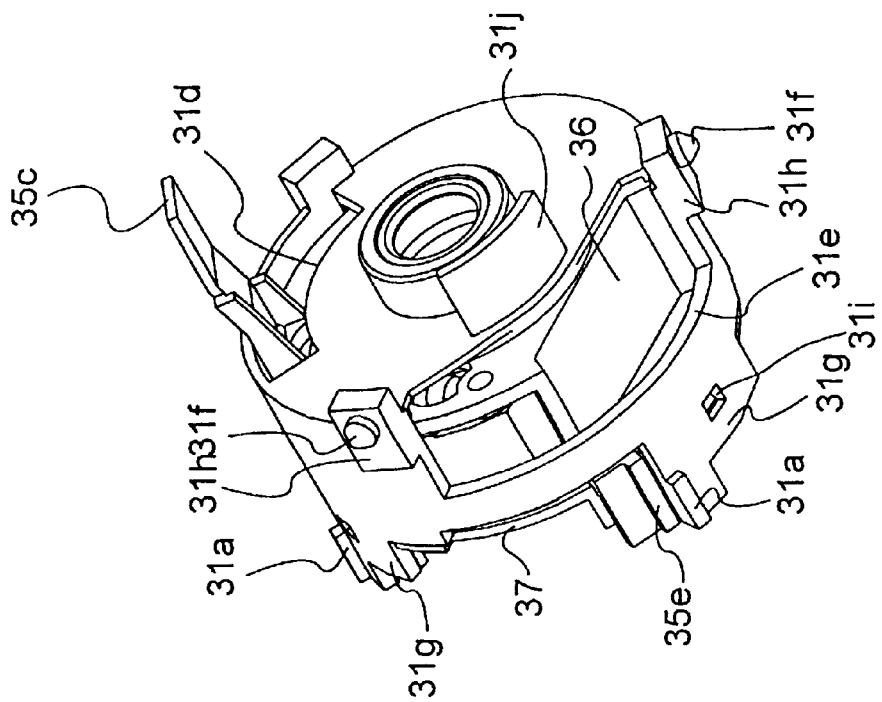
FIG. 6 is a view similar to that of FIG. 4, showing a position where the second lens group moving frame has rotated by a predetermined amount of rotation with respect to the shutter unit from the position shown in FIG. 4.

The second lens group moving frame 31 is provided, on the outer circumferential wall thereof in the vicinity of the front end of the outer circumferential wall, with three engaging holes 31i positioned on a circle about the optical axis O. A shutter pressure plate 37 positioned in front of the shutter unit 36 is provided, on an outer peripheral surface thereof, with three engaging projections 37a which are elastically engaged in the three engaging holes 31i, respectively. The shutter support ring 35 and the shutter unit 36 are prevented from coming off the annular recess 31c by the shutter pressure plate 37 in a manner such that the shutter pressure plate 37 closes the front end of the annular recess 31c with the three engaging projections 37a being engaged in the three engaging holes 31i (see FIGS. 4 and 6).

The shutter pressure plate 37 is provided on a front surface thereof with three engaging protrusions 37b. A low-frictional ring sheet 38 is fixed to a front annular surface of the shutter pressure plate 37 to be held between the three engaging protrusions 37b and the front annular surface of the shutter pressure plate 37. The low-frictional ring sheet 38 is made of a low-frictional material such as a tetrafluoroethylene resin.

The shutter unit 36 is provided with shutter blades 36a (see FIGS. 8 through 10). The shutter unit 36 drives the shutter blades 36a to open and close in accordance with information on an object brightness. The zoom lens barrel 10 is provided therein with a flexible printed wiring board (flexible PWB) F, one end (front end) of which is fixed to the shutter unit 36 (see FIGS. 8 through 10). A drive signal is given to the shutter unit 36 via the flexible PWB F. As shown in FIGS. 8 through 10, the flexible PWB F extends rearward from the shutter unit 36 on an upper surface of the flexible PWB fixing member 35c therealong, and bends radially inwards to subsequently extend forward. Subsequently, the flexible PWB F is fixed to a lower surface of the flexible PWB fixing member 35c with adhesive tape, and bends radially inwards to extend rearward. Subsequently, the flexible PWB F extends through the CCD holding frame 13 via a through-slot 13a (see FIG. 1) formed thereon, and bends radially outwards to extend upwards along a rear surface of the CCD holding frame 13. Subsequently, flexible PWB F bends to extend forward and above the stationary barrel 11. The second lens group moving frame 31 is provided on a rear surface thereof with a flexible PWB support member 31j (see FIG. 8) for supporting (taking up) the slack of the flexible PWB.

The zoom lens barrel 10 is provided with a third lens frame 39 to which the third lens group L3 is fixed. As shown in FIG. 1, the third lens frame 39 is guided in the optical axis direction via a pair of linear guide rods 40 which extend parallel to the optical axis O. The front and rear ends of each linear guide rod 40 are fixed to the shaft holding member 12 and the CCD holding frame 13, respectively. The third lens frame 39 is driven to move in the optical axis direction by rotation of a feed screw shaft 41 which is driven forward and backward by a step motor (not shown) in accordance with information on a photographing distance.

Figure 20:
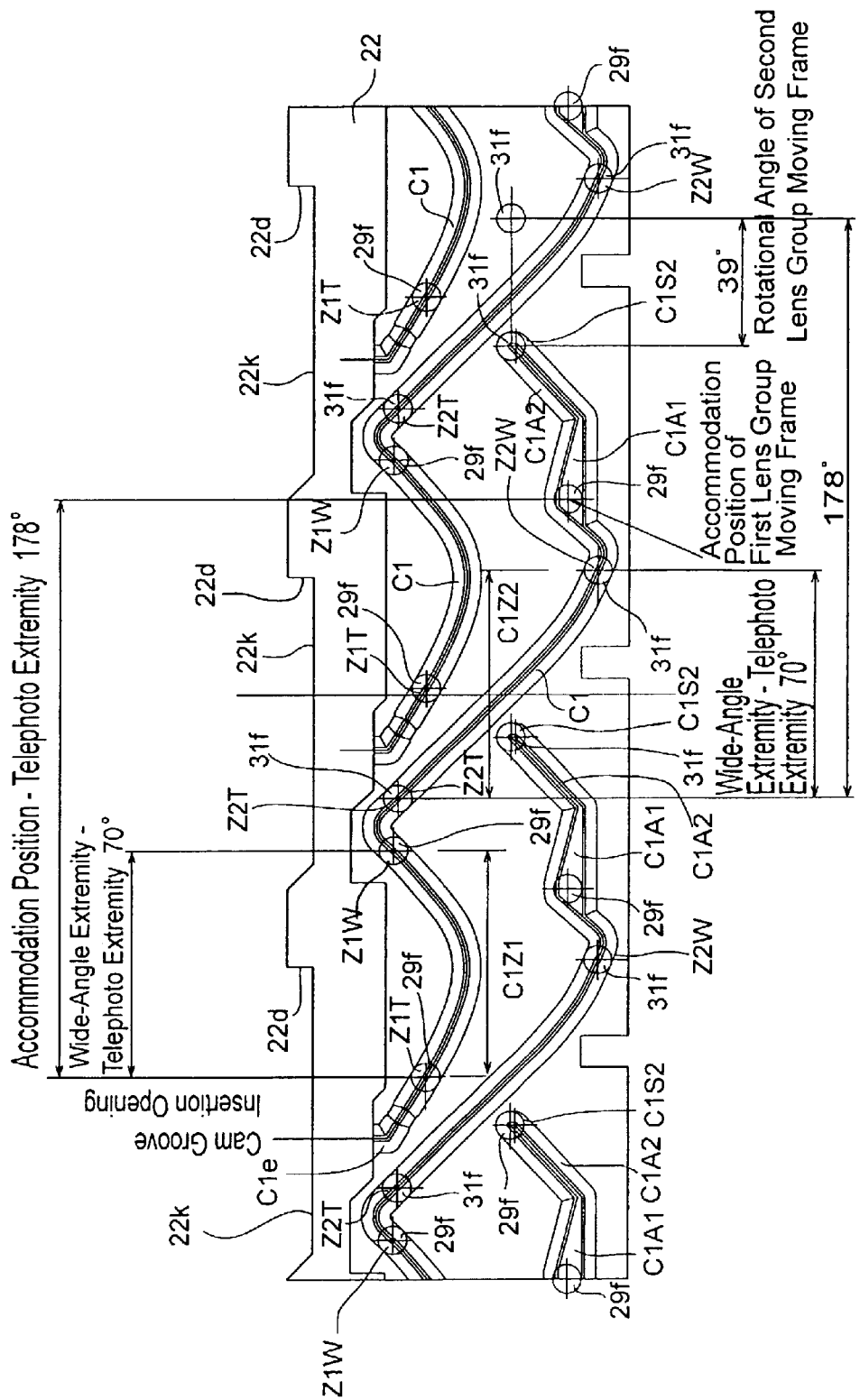
FIG. 20 is a developed view of an inner peripheral surface of the cam ring.

A zooming operation is carried out by moving the first and second lens groups L1 and L2 (the first and second lens group moving frames 29 and 31) in the optical axis direction relative to the third lens group L3 while varying the distance therebetween. The cam ring 22 is provided, on an inner peripheral surface thereof at equi-intervals (intervals of 120 degrees) in a circumferential direction of the cam ring 22, with three lens-drive cam grooves C1. The first lens group moving frame 29 and the second lens group moving frame 31, which are guided linearly in the optical axis direction without rotating about the optical axis O, move in the optical axis direction by rotation of the cam ring 22 in accordance with the profiles of the lens-drive cam grooves C1. FIG. 20 shows a developed view of the lens-drive cam grooves C1. The zoom lens barrel 10 is characterized in that each lens-drive cam groove C1 is formed as a continuous bottomed groove to have respective cam groove portions for the first and second lens groups L1 and L2, and that the first and second lens groups L1 and L2 are released from the constraints of the three lens-drive cam grooves C1 at their respective accommodation positions so that the first and second lens groups L1 and L2 can be accommodated to be positioned close to each other until the first lens group supporting frame 32 and the second lens group moving frame 31 come into contact with each other.

Namely, three follower pins (first cam followers) 29f which are projected radially outwards from the first lens group moving frame 29 and three follower pins (second cam followers) 31f which are projected radially outwards from the second lens group moving frame 31 are slidably engaged in the three lens-drive cam grooves C1, respectively. Each lens-drive cam groove C1, which is formed as a continuous bottomed groove, has a function to move the first and second lens groups L1 and L2 in their respective zoom paths. Unlike the present embodiment of the zoom lens barrel 10, in a conventional zoom lens barrel having a cam ring for driving a plurality of movable lens groups, a set of cam grooves is necessary for each of the plurality of movable lens groups.

As shown in FIG. 20, each lens-drive cam groove C1 is provided at one end thereof with an insertion end C1e via which one of the three follower pins 29f of the first lens group moving frame 29 and one of the three follower pins 31f of the second lens group moving frame 31 are inserted into the lens-drive cam groove C1. Each lens-drive cam groove C1 is further provided with a first-lens-group zooming section (front lens group moving section) C1Z1, a second-lens-group zooming section (rear lens group moving section) C1Z2, a first-lens-group accommodation portion (front-lens-group accommodation portion) C1A1, a connecting portion (straight connecting portion) C1A2 and a second-lens-group-accommodation end portion (rear-lens-group accommodation portion) C1S2, in that order from the insertion end C1e. The opposite ends (left and right ends as viewed in FIG. 20) of the first-lens-group zooming section C1Z1 determines a telephoto extremity Z1T and a wide-angle extremity Z1W of the first lens group L1, respectively. The opposite ends (left and right ends as viewed in FIG. 20) of the second-lens-group zooming section C1Z2 determines a telephoto extremity Z2T and a wide-angle extremity Z2W of the second lens group L2, respectively. As shown in FIG. 20, in this particular embodiment of the zoom lens barrel 10, the angle of rotation of the cam ring 22 when driving each of the first and second lens group moving frames 29 and 31 from the accommodation position to the telephoto extremity is predetermined at 178 degrees, and the angle of rotation of the cam ring 22 when driving each of the first and second lens group moving frames 29 and 31 from the wide-angle extremity to the telephoto extremity is determined at 70 degrees.

As shown in FIG. 20, the width of the first-lens-group accommodation portion C1A1 of the lens-drive cam groove C1 in the optical axis direction (the vertical direction as viewed in FIG. 20) is greater than the width of the other portions of the lens-drive cam groove C1 so that the associated follower pin 29f can move freely in the first-lens-group accommodation portion C1A1. Namely, the first-lens-group accommodation portion C1A1 extends in a circumferential direction of the cam ring 22, and also widens in the optical axis direction to form a clearance for the associated follower pin 29f of the first lens group moving frame 29 to be movable in the optical axis direction by an amount of movement corresponding to the range of adjustment of the thread engagement position of the male thread portion of the first lens group supporting frame 32 with respect to the female thread portion 29d of the inner flange 29g. The second-lens-group-accommodation end portion C1S2 of the connecting portion C1A2, which is one end of the connecting portion C1A2 on the side opposite from the first-lens-group accommodation portion C1A1, is shaped to form a clearance for the associated follower pin 31f of the second lens group moving frame 31 to be slightly movable both in the optical axis direction and in a circumferential direction of the cam ring 22 when the associated follower pin 31f is engaged in the second-lens-group-accommodation end portion C1S2.

Figure 16:
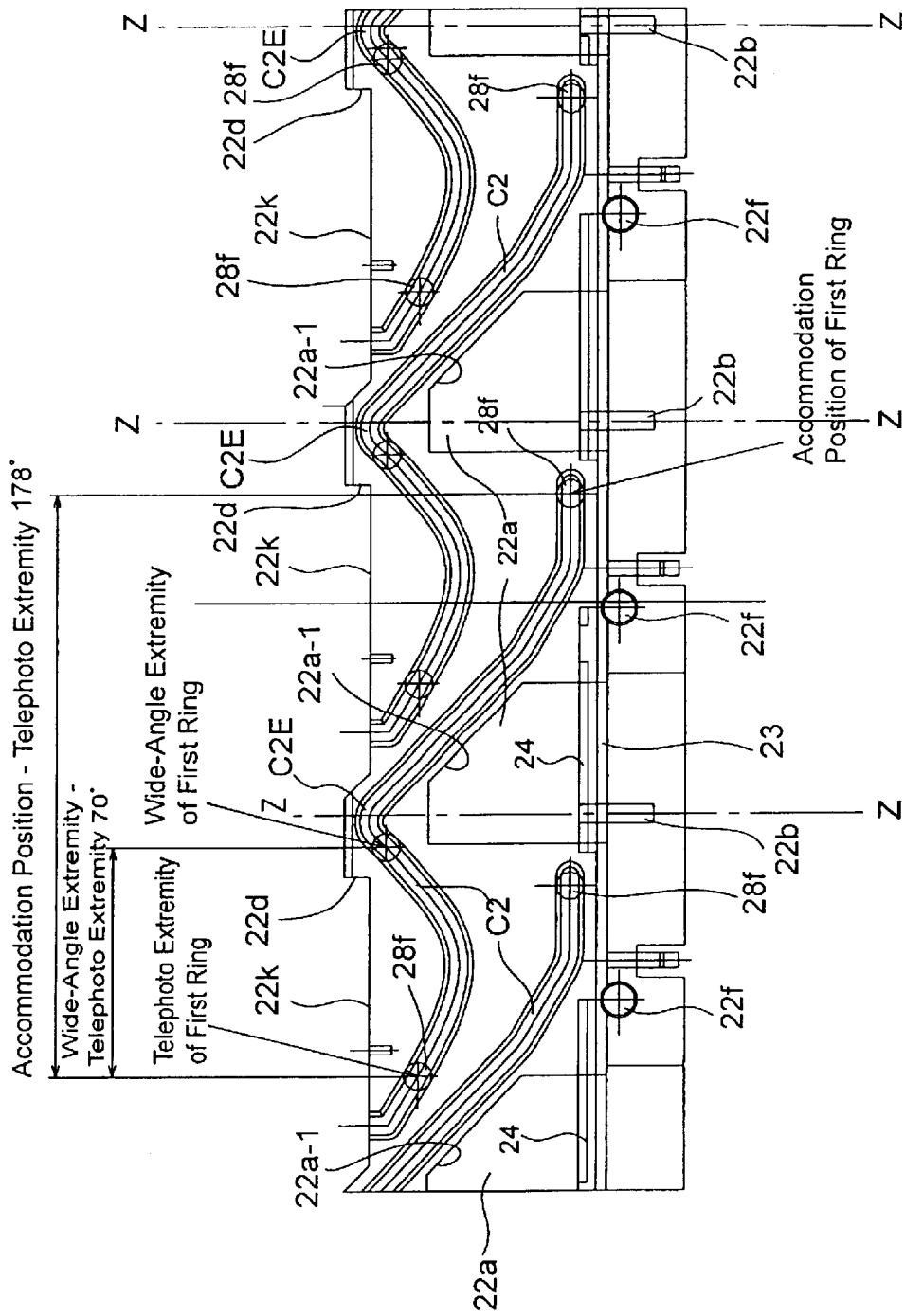
FIG. 16 is a developed view of an outer peripheral surface of the cam ring.

As shown in FIG. 16, which shows a developed view of the outer peripheral surface of the cam ring 22, the three engaging recesses 22a of the cam ring 22 are formed so as not to interfere with the three cam grooves C2, which are formed on an outer peripheral surface of the cam ring 22 so as to have a substantially V-shaped profile (cam path) in a development view as shown in FIG. 16. The front end of each engaging recess 22a is positioned just behind an adjacent peak (frontmost peak portion) C2E of the associated cam groove C2 which is the frontmost portion of the cam groove C2. The front end of each engaging recess 22a is formed to have an oblique surface 22a-1 so that each engaging recess 22a does not interfere with the associated cam grooves C2. The front end portion of each rotation-transmission arm 20b is formed to have an oblique cutout portion 20d which is shaped to correspond to the oblique surface 22a-1 of the engaging recess 22a (See FIG. 11B). Furthermore, as shown in FIG. 16, the three guide keys 22b are provided in the close vicinity of the three bayonet prongs 24, and are each formed so as to extend along an extension line Z which extends parallel to the optical axis through the corresponding peak C2E. In other words, the three guide keys 22b are each provided at a circumferential position of longest portion of a corresponding engaging recess 22a in a direction parallel to the optical axis. Accordingly, since the three guide keys 22b can be made long in the direction parallel to the optical axis, the linear guidance precision thereof can be increased.

The relative angular positions of the three follower pins 29f and the three follower pins 31f about the optical axis O are determined so that each follower pin 29f and each follower pin 31f are respectively positioned in the first-lens-group accommodation portion C1A1 and the second-lens-group-accommodation end portion C1S2 of the connecting portion C1A2 when the cam ring 22 is positioned in an accommodation position thereof (see FIG. 20). The first-lens-group accommodation portion C1A1 and the second-lens-group-accommodation end portion C1S2 of the connecting portion C1A2, to some extent, do not constrain movement of the associated follower pins 29f and 31f, respectively. Namely, each follower pin 29f and each follower pin 31f can move in the first-lens-group accommodation portion C1A1 and the second-lens-group-accommodation end portion C1S2 of the connecting portion C1A2, respectively, in the optical axis direction because of the clearance formed between each groove portion and the associated follower pin. This clearance contributes to further miniaturization of the length of the zoom lens barrel 1 in an accommodation position thereof.

Since the three helical compression springs 30 press the first lens group moving frame 29 rearwards in the optical axis direction as described above, the lens pressure ring 32a that is supported by the first lens group moving frame 29, can retract up to a mechanically contacting point P (see FIG. 8) where the lens pressure ring 32a comes in contact with the low-frictional ring sheet 38 that is fixed to the front surface of the shutter pressure plate 37, due to the clearance between the first-lens-group accommodation portion C1A1 of each lens-drive cam groove C1 of the cam ring 22 and the associated follower pin 29f of the first lens group moving frame 29. Likewise, the flexible PWB support member 31j of the second lens group moving frame 31 can retract up to a mechanically contacting point Q (see FIG. 8) where the second lens group moving frame 31 comes in contact with the third lens frame 39 due to a clearance between the second-lens-group-accommodation end portion C1S2 of the connecting portion C1A2 of each lens-drive cam groove C1 of the cam ring 22 and the associated follower pin 31f of the second lens group moving frame 31.

Due to such structures of the mechanically contacting points P and Q, the length of the zoom lens barrel 10 in an accommodation position thereof is successfully reduced as compared with a conventional zoom lens barrel in which the respective accommodation positions of first and second lens groups which correspond to the first and second lens groups L1 and L2 of the present embodiment of the zoom lens barrel are precisely determined by associated cam grooves. Furthermore, as shown in FIG. 8, the third lens frame 39 can retract up to a mechanically contacting point R where the third lens frame 39 comes in contact with the CCD holding frame 13 while compressing a helical compression spring 42, which is fitted on the feed screw shaft 41 to be positioned between the third lens frame 39 and the CCD holding frame 13 to bias the third lens frame 39 forward.

FIG. 8 shows an accommodation position of the zoom lens barrel 10 where the first lens group moving frame 29 (lens pressure ring 32a) is in contact with the low-frictional ring sheet 38, where the second lens group moving frame 31 is in contact with the third lens frame 39, and where the third lens frame 39 is in contact with the CCD holding frame 13.

The amount of rearward movement of the first lens group moving frame 29 relative to the second lens group moving frame 31 depends on the position of the first lens group supporting frame 32 relative to the first lens group moving frame 29, since the position of the second lens group supporting frame 32 relative to the first lens group moving frame 29 varies by an adjustment of the thread engagement position of the male thread portion of the first lens group supporting frame 32 with respect to the female thread portion 29d of the inner flange 29g during assembly. Such a variation due to the adjustment is absorbed by extension or compression of the helical compression springs 30 so that the zoom lens barrel 10 can be accommodated with the lens pressure ring 32a, the second lens group moving frame 31, and the third lens frame 39 being in contact with the low-frictional ring sheet 38, the third lens frame 39, and the CCD holding frame 13 at the mechanically contacting points P, Q and R, respectively.

If the cam ring 22 rotates in a direction from the accommodation position toward a photographing position in the zooming groove portion 11a4, each follower pin 29f of the first lens group moving frame 29 which is engaged in the first-lens-group accommodation portion C1A1 moves from the first-lens-group accommodation portion C1A1 to the first-lens-group zooming section C1Z1 via the second-lens-group zooming section C1Z2, while each follower pin 31f of the second lens group moving frame 31 which is engaged in the connecting portion C1A2 moves from the connecting portion C1A2 to the second-lens-group zooming section C1Z2 via the first-lens-group accommodation portion C1A1. Accordingly, the second-lens-group zooming sections C1Z2 of the three lens-drive cam grooves C1 that are used for driving the three follower pins 31f of the second lens group moving frame 31 are used as mere passing sections for the three follower pins 29f of the first lens group moving frame 29 via which the three follower pins 29f move from the first-lens-group accommodation position to the photographing position. The above-described structure which provides such passing sections is advantageous to reduce the number of cam grooves which are to be formed on the cam ring 22, which is in turn advantageous to reduce the angle of inclination of each cam groove with respect to a circumferential direction of the cam ring 22.

Figure 17A:
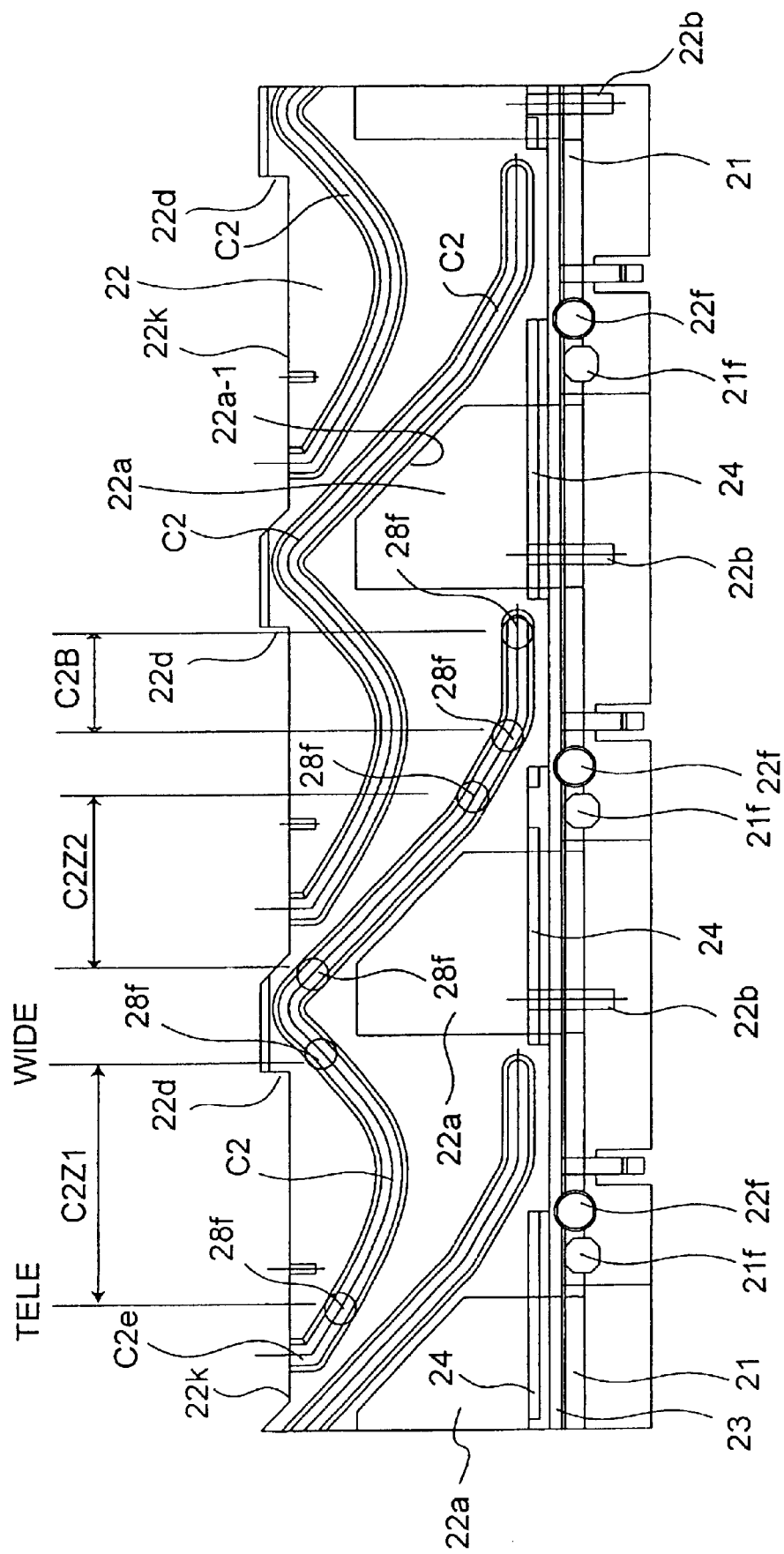
FIG. 17A is a developed view of outer peripheral surfaces of the cam ring and the biasing ring fitted on the rear end of the cam ring.
Figure 18:
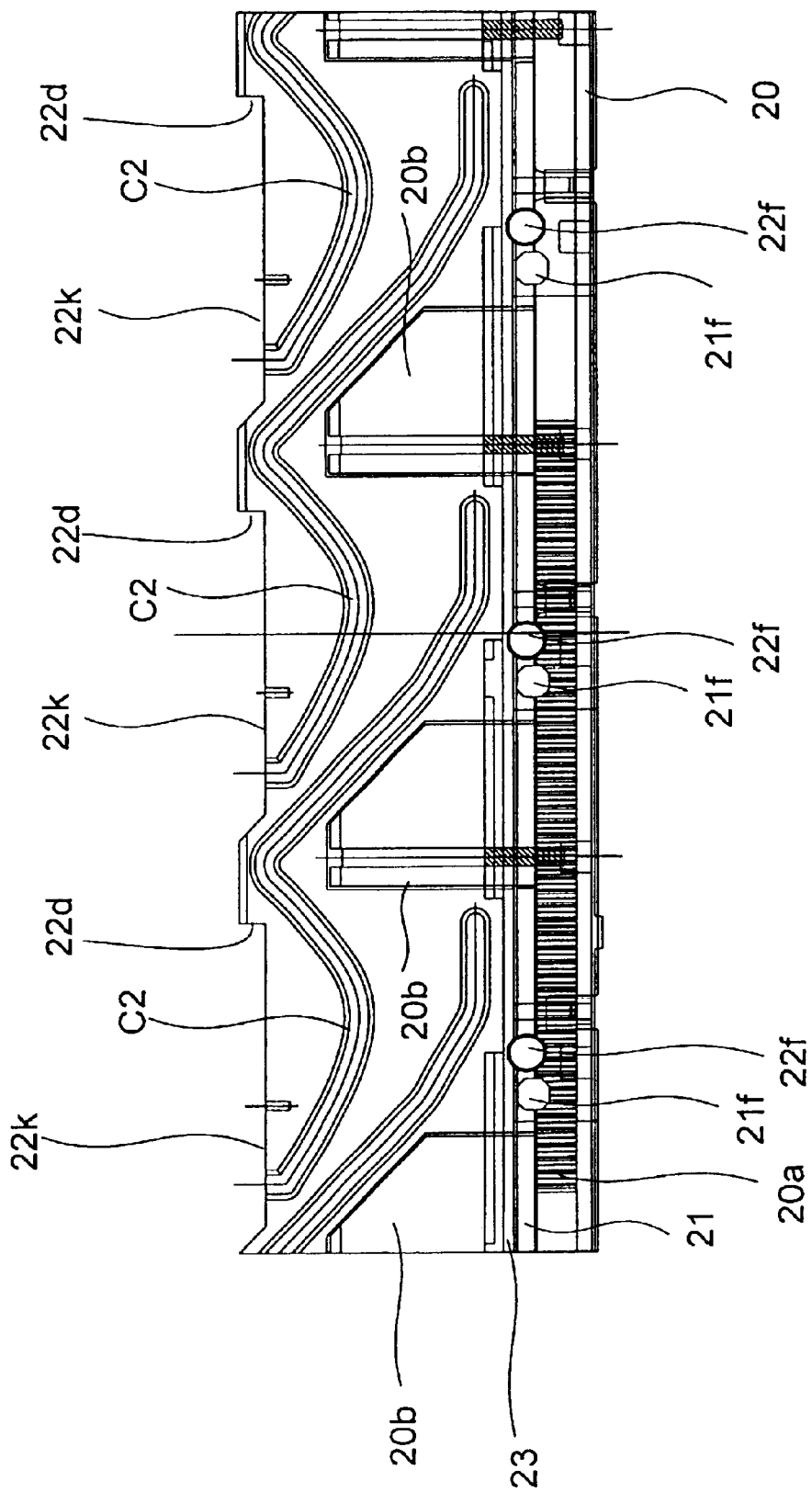
FIG. 18 is a developed view of outer peripheral surfaces of the cam ring, the rotational ring and the biasing ring in the accommodation position shown in FIG. 12.
Figure 19:
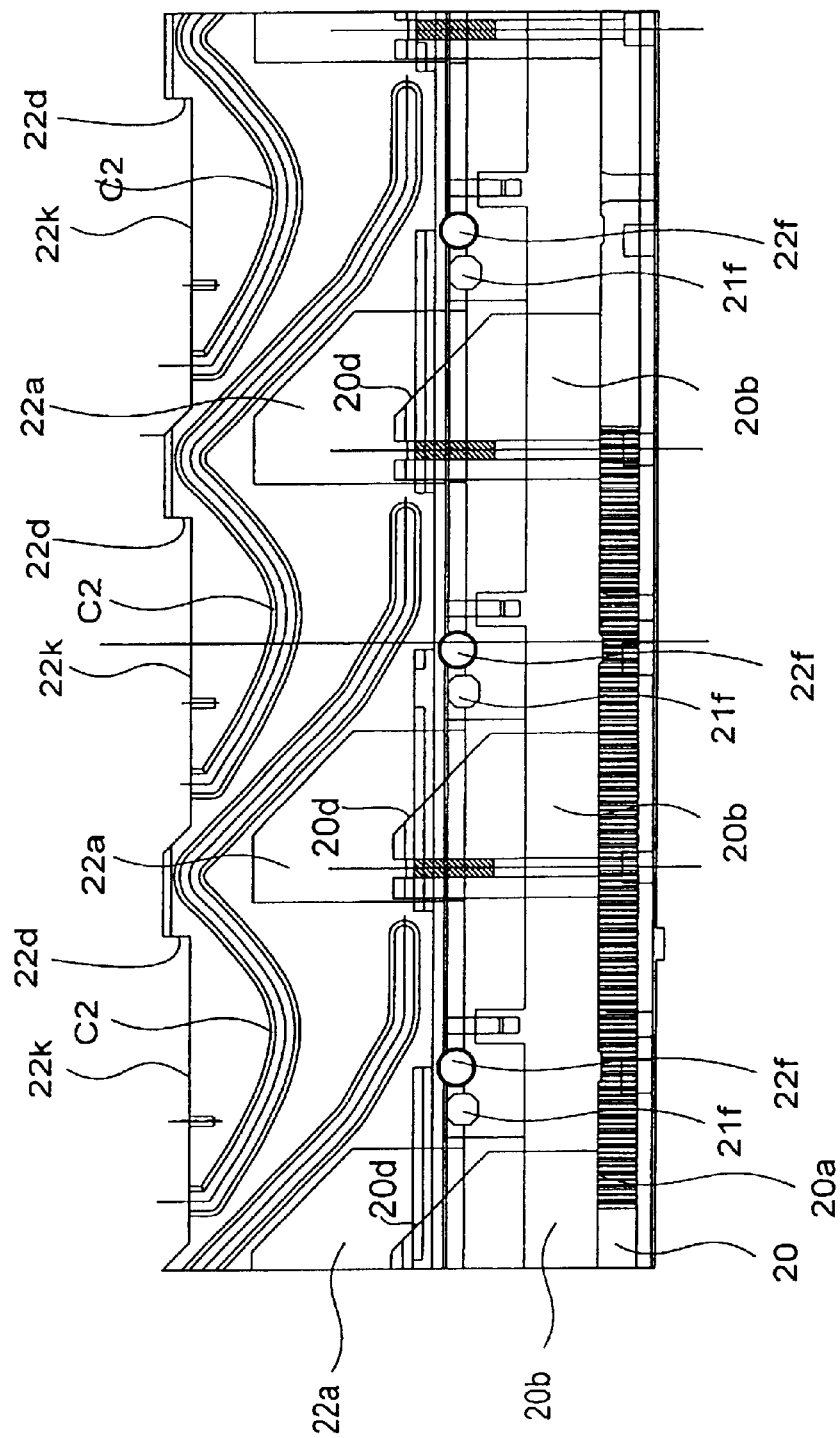
FIG. 19 is a developed view of outer peripheral surfaces of the cam ring, the rotational ring and the biasing ring in the photographing position shown in FIG. 13.

The first ring 28 moves in the optical axis direction independent of the first lens group moving frame 29 in a moving path which is substantially the same as the moving path of the first lens group moving frame 29. Accordingly, the cam ring 22 is provided, on an outer peripheral surface at equi-intervals (intervals of 120 degrees) in a circumferential direction thereof, with the three cam grooves C2 (see FIGS. 16 through 19). The first ring 28 is provided, on an inner peripheral surface at equi-intervals in a circumferential direction thereof, with three follower pins 28f which are slidably engaged in the three cam grooves C2 of the cam ring 22, respectively. The profiles of the cam grooves C2 resemble those of the lens-drive cam grooves C1. As shown in FIG. 17A, each cam groove C2 is provided atone end thereof with an insertion end C2e via which one of the three follower pins 28f of the first ring 28 is inserted into the cam groove C2. Each cam groove C2 is further provided with a first section C2Z1 which corresponds to the first-lens-group zooming section C1Z1, a second section C2Z2 which corresponds to the second-lens-group zooming section C1Z2, and a barrier drive section C2B. The barrier drive section C2B extends in a circumferential direction of the cam ring 22, so that the cam ring 22 rotates about the optical axis O without moving in the optical axis direction relative to the first ring 28 as long as each follower pin 28f is engaged in the barrier drive section C2B. As shown in FIG. 16, in this particular embodiment of the zoom lens barrel 10, the angle of rotation of the cam ring 22 when driving the first ring 28 from the accommodation position to the telephoto extremity is predetermined at 178 degrees, and the angle of rotation of the cam ring 22 when driving the first ring 28 from the wide-angle extremity to the telephoto extremity is determined at 70 degrees.

By providing the first ring 28, which extends forward so that an outer peripheral surface thereof is exposed to the outside of the zoom lens barrel 10, as an element separate from the first lens group moving frame 29, and by guiding the first ring 28 in the optical axis direction via a cam mechanism independent of the first lens group moving frame 29 as described above, external forces applied to the first ring 28 can be prevented from being transferred to the first lens group L1 via the first lens group moving frame 29, which in turn prevents deterioration in optical performance of the zoom lens barrel 10 due to eccentricity of the optical axis of the first lens group L1. In addition, the structure of the cam ring 22 wherein the three lens-drive cam grooves C1 and the three cam grooves C2, whose cam profiles are similar (though differing slightly in shape) to each other, are formed on the cam ring 22 in slightly different positions thereon in the optical axis direction does not increase the wall thickness of the cam ring 22. Moreover, external forces applied to the first ring 28 rearward in the optical axis direction can be received by the first lens group moving frame 29 via the three follower pins 29f.

Furthermore, since the three follower pins 28f, which are respectively engaged in the three cam grooves C2, and the three follower pins 29f, which are respectively engaged in the three lens-drive cam grooves C1, are respectively aligned side by side in a direction parallel to the optical axis O, the strength of the spring force of the three helical compression springs 30 that are held between the first ring 28 and the first lens group moving frame 29 to bias the first ring 28 and the first lens group moving frame 29 in opposite directions away from each other varies little even if the cam ring 22 rotates relative to the first ring 28 and the first lens group moving frame 29.

As shown in FIG. 1, the barrier unit 43 includes a barrier blade support front plate 45, a pair of barrier blades 46, two torsion springs 47 and a barrier blade support rear plate 48, and is fixed to the front end of the first ring 28 to be positioned therein, in front of the inner flange 28b. The barrier drive ring 44 is positioned in the first ring 28 and held between the barrier unit 43 and the inner flange 28b of the first ring 28 to be rotatable freely about the optical axis O. The cam ring 22 is provided at the front end thereof with three recesses 22k (see FIGS. 16 through 20). The barrier drive ring 44 is provided on an outer peripheral surface thereof with three engaging portions 44a. The cam ring 22 is provided at one end of each recesses 22k with a rotation transfer face 22d which extends parallel to the optical axis O and extends through a corresponding circumferential slot 28z (see FIG. 1) formed on the inner flange 28b of the first ring 28. As shown in FIGS. 16 through 20, the three recesses 22k are formed on the cam ring 22 at portions thereon other than the portions where the three cam grooves C2 are formed.

As shown in FIG. 1, the barrier unit 43, which includes the barrier blade support front plate 45, the pair of barrier blades 46, the two torsion springs 47 and the barrier blade support rear plate 48, is formed as a single assembly in advance. The barrier blade support front plate 45 is provided at the center thereof with a photographing aperture 45a, and is further provided, on a rear surface thereof on opposite sides of the photographing aperture 45a, with two bosses (not shown) respectively, which extend rearwards. Each barrier blade 46 is provided at one end thereof with a hole in which one of the two bosses is engaged so that each barrier blade 46 is rotatable about the associated boss. The two torsion springs 47 bias the pair of barrier blades 46 to rotate in opposite rotational directions to shut the pair of barrier blades 46, respectively. The pair of barrier blades 46 are supported between the barrier blade support front plate 45 and the barrier blade support rear plate 48. The barrier blade support rear plate 48 is provided at the center thereof with a central aperture which is aligned with the photographing aperture 45a in the optical axis direction, and is further provided on opposite sides of the central aperture with two slots 48a. Each barrier blade 46 is provided in the vicinity of the associated boss with an engaging projection 46a (only one of which appears in FIGS. 8 through 10) which extends rearward, toward the barrier drive ring 44, to pass through the associated slot 48a of the barrier blade support rear plate 48.

The barrier drive ring 44 is biased to rotate in a direction to open the pair of barrier blades 46 by a helical extension spring 49 whose opposite ends are hooked on an engaging projection 44b formed on the barrier drive ring 44 and an engaging projection 28h formed on a front surface of the inner flange 28b of the first ring 28. The spring force of the helical extension spring 49 is greater than the total spring force of the two torsion springs 47. The two drive projections 44c of the barrier drive ring 44 come into contact with the two engaging projections 46a of the pair of barrier blades 46 to open the pair of barrier blades 46, respectively, when the barrier drive ring 44 is in a fully rotated position thereof due to the spring force of the helical extension spring 49. If the barrier drive ring 44 is rotated in a direction to close the pair of barrier blades 46 against the spring force of the helical extension spring 49, the two drive projections 44c respectively move away from the two engaging projections 46a of the pair of barrier blades 46 so that the pair of barrier blades 46 are closed by the spring force of the two torsion springs 47.

The three rotation transfer faces 22d of the cam ring 22 respectively come into contact with the three engaging portions 44a of the barrier drive ring 44 to press the three engaging portions 44a against the spring force of the helical extension spring 49 to rotate the barrier drive ring 44. When the cam ring 22 is in the accommodation position thereof, the three rotation transfer faces 22d are respectively in contact with the three engaging portions 44a of the barrier drive ring 44 via the three circumferential slots 28z formed on the inner flange 28b of the first ring 28. The barrier drive ring 44 is rotated about the optical axis O against the spring force of the helical extension spring 49 to close the pair of barrier blades 46. If the cam ring 22 rotates about the optical axis O in a barrier opening direction (counterclockwise as viewed from the front of the zoom lens barrel 10) with respect to the first ring 28, with the three follower pins 28f being respectively engaged within the barrier drive sections C2B of the three cam grooves C2 of the cam ring 22, the three rotation transfer faces 22d are respectively disengaged from the three engaging portions 44a of the barrier drive ring 44 so that the barrier drive ring 44 is rotated in a direction to open the pair of barrier blades 46 by the spring force of the helical extension spring 49.

The barrier unit 43 having the above described structure is fitted into the front end opening of the first ring 28 from the front thereof. The barrier blade support front plate 44 is provided on an outer peripheral edge thereof with a plurality of engaging portions which are respectively engaged with a corresponding plurality of hooks (not shown) formed on an inner peripheral surface of the front end opening of the first ring 28 to prevent the barrier unit 43 from coming off the front of the first ring 28. The barrier drive ring 44 is held between the barrier unit 43 and the inner flange 28b of the first ring 28 to be rotatable about the optical axis O.

As has been described above, the zooming groove portion 11a4 (see FIG. 28) of each cam groove 11a of the stationary barrel 11 extends in a circumferential direction of the stationary barrel 11 and does not extend in the optical axis direction. Therefore, the cam ring 22 rotates about the optical axis O without moving in the optical axis direction when the three follower pins 22f of the cam ring 22 and the three follower pins 21f of the biasing ring 21 follow the three zooming groove portions 11a4 of the three cam grooves 11a in the zooming section, respectively. In the zooming section that is determined by the zooming groove portion 11a4, it is necessary to remove backlash and play between the three follower pins 22f and the zooming groove portions 11a4 of the three cam grooves 11a.

To remove such backlash and play, each of the three follower pins 21f and the associated one of the three follower pins 22f are engaged in a common cam groove of the three cam grooves 11a of the stationary barrel 11 at slightly different circumferential positions as shown in FIG. 28, and each follower pin 21f of the biasing ring 21 and each follower pin 22f of the cam ring 22 are pressed against a rear side edge of the associated cam groove 11a and a front side edge of the same cam groove 11a, respectively, by the spring force of the three compression helical springs 26. Due to this structure wherein the three follower pins 22f of the cam ring 22 are pressed against the front side edges of the zooming groove portion 11a4 of the three cam grooves 11a when engaged in the zooming groove portion 11a4, backlash and play between the three follower pins 22f and the zooming groove portions 11a4 of the three cam grooves 11a are removed.

In addition to the above described structures wherein the three linear guide grooves 29c are formed on an inner peripheral surface of the first lens group moving frame 29 while the three linear guide keys 31*a*, which are respectively engaged in the three linear guide grooves 29*c*, are formed on an outer peripheral surface of the second lens group moving frame 31, three circumferential recesses (wide-width engaging portions) 29*h* (see FIGS. 21A through 21J) are formed on the first lens group moving frame 29 at the front ends of the three linear guide grooves 29*c*, respectively, so as to communicatively connect therewith. Each circumferential recess 29*h* allows the associated linear guide key 31*a* of the second lens group moving frame 31 to move therein in a circumferential direction about the optical axis O, i.e., allows the second lens group moving frame 31 to rotate about the optical axis O relative to the first lens group moving frame 29 in a range corresponding to the circumferential length of the circumferential recess 29*h*. The second lens group moving frame 31 can rotate about the optical axis O relative to the first lens group moving frame 29 along the three circumferential recesses 29*h* only when the second lens group moving frame 31 is in the vicinity of the accommodation position thereof.

Note that the first lens group moving frame 29 is provided on the inner flange 29*g* thereof with three circumferential slots 29*j* (see FIGS. 24 through 27). The second lens group moving frame 31 is provided at the front end thereof with three front projecting portions 31*g* on respective outer surfaces on which the three linear guide keys 31*a* are formed, respectively. When each linear guide key 31*a* is positioned in the associated circumferential recess 29*h*, i.e., when the second lens group L2 is in the vicinity of the accommodation position thereof, the three front projecting portions 31*g* of the second lens group moving frame 31 extend through the inner flange 29*g* of the first lens group moving frame 29 to project forward from the inner flange 29*g* via the three circumferential slots 29*j*, respectively. Accordingly, allowing the three linear guide keys 31*a* to project forward from the inner flange 29*g* through the three circumferential slots 29*j*, respectively, achieves the short length of the zoom lens barrel 10 in an accommodation position shown in FIG. 8.

Figure 21B:
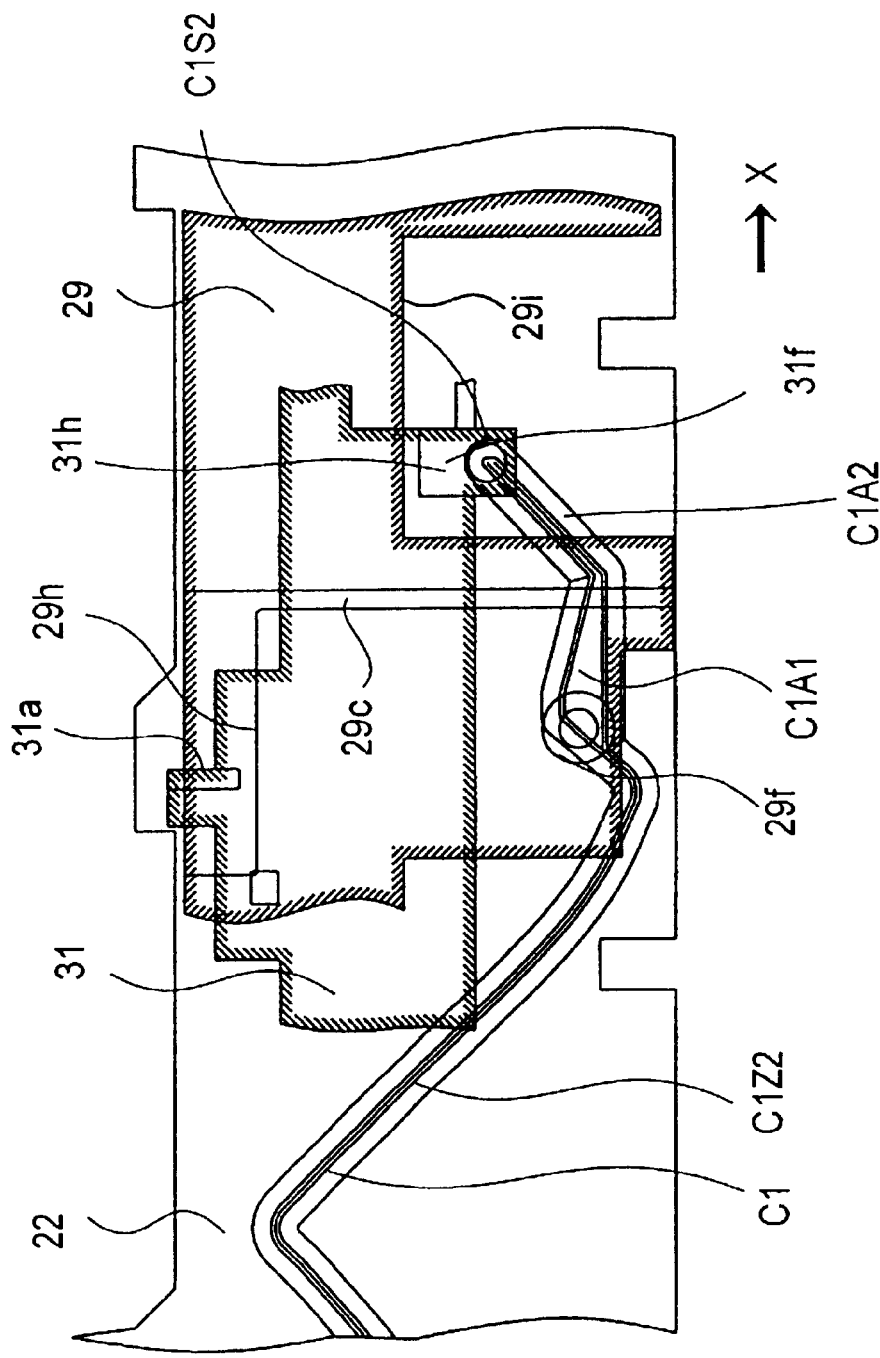

In a state where the zoom lens barrel 10 is in an accommodation position, i.e., where each of the three follower pins 29*f* of the first lens group moving frame 29 is engaged in the first-lens-group accommodation portion C1A1 of the associated lens-drive cam groove C1 as shown in FIG. 21A, a rotation of the cam ring 22 in a direction to extend the zoom lens barrel 10 (in a direction indicated by an arrow "X" in FIGS. 21A through 21J, i.e., counterclockwise as viewed from the front of the zoom lens barrel 10) causes each follower pin 29*f* of the first lens group moving frame 29 to move slightly from the first-lens-group accommodation portion C1A1 toward the second-lens-group zooming section C1Z2 of the associated lens-drive cam groove C1 as shown in FIG. 21B. At this time, each follower pin 31*f* of the second lens group moving frame 31 does not move out from the second-lens-group-accommodation end portion C1S2 of the connecting portion C1A2.

Figure 21C:
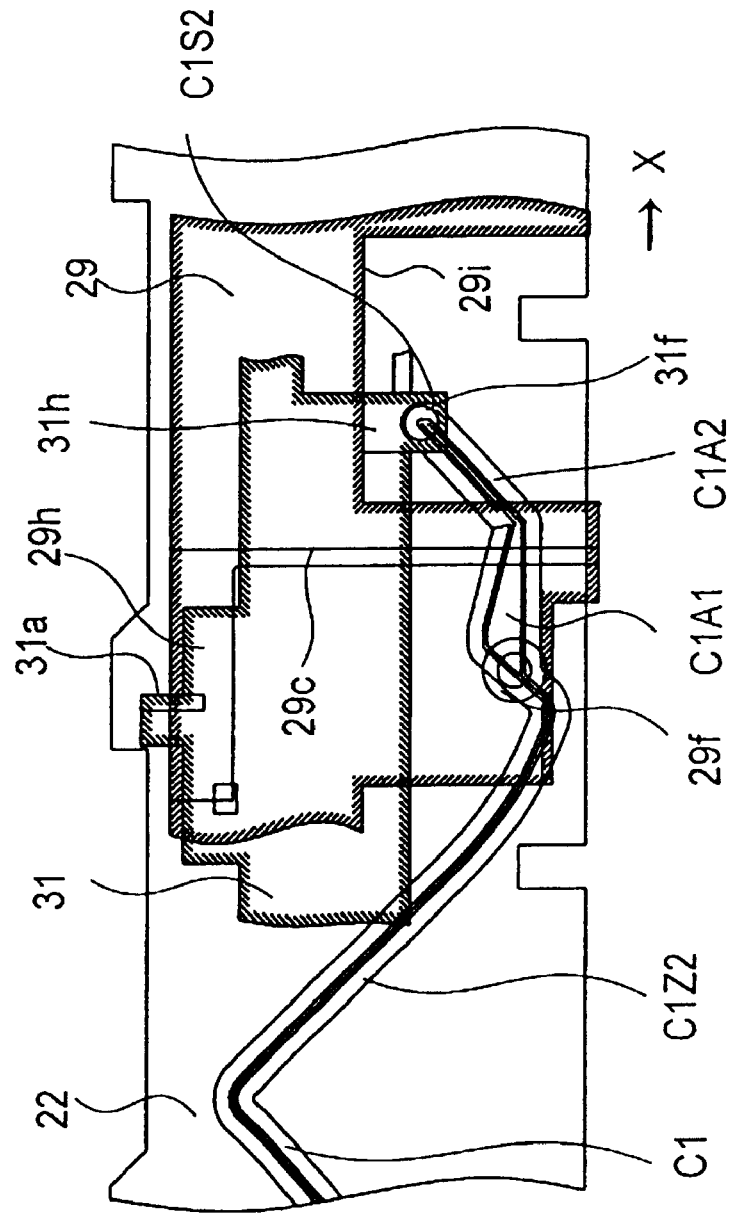

Further rotational movement of the cam ring 22 in the same direction X causes each follower pin 29*f* of the first lens group moving frame 29 to further move slightly toward the second-lens-group zooming section C1Z2 while moving rearward slightly in the optical axis direction as shown in FIG. 21C. At the same time, since each follower pin 31*f* does not move out from the second-lens-group-accommodation end portion C1S2 of the connecting portion C1A2, front end surfaces (upper end surfaces as viewed in FIG. 21C) of the three cutout portions 29*i* of the second lens group moving frame 29 come into contact with front end surfaces of the three engaging projections 31*h* of the second lens group moving frame 31, respectively, as shown in FIG. 21C.

Figure 21D:
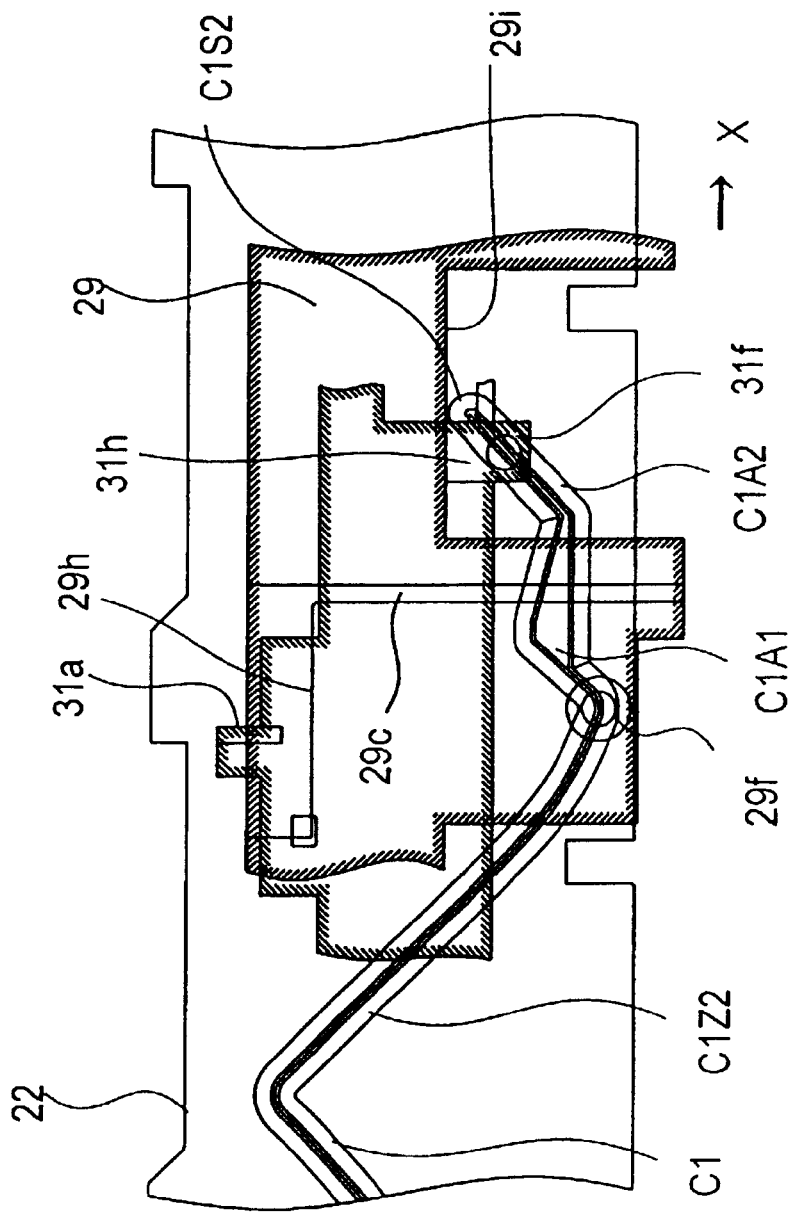

Further rotational movement of the cam ring 22 in the same direction X causes each follower pin 29*f* of the first lens group moving frame 29 to further move slightly toward the second-lens-group zooming section C1Z2 while moving rearward (downward as viewed in FIG. 21D) in the optical axis direction so that the front end surfaces of the three cutout portions 29*i* press the three engaging projections 31*h* rearward in the optical axis direction, respectively, to move each follower pin 31*f* of the second lens group moving frame 31 in the connecting portion C1A2 from the second-lens-group-accommodation end portion C1S2 thereof toward the first-lens-group accommodation portion C1A1 as shown in FIG. 21D.

Figure 21E:
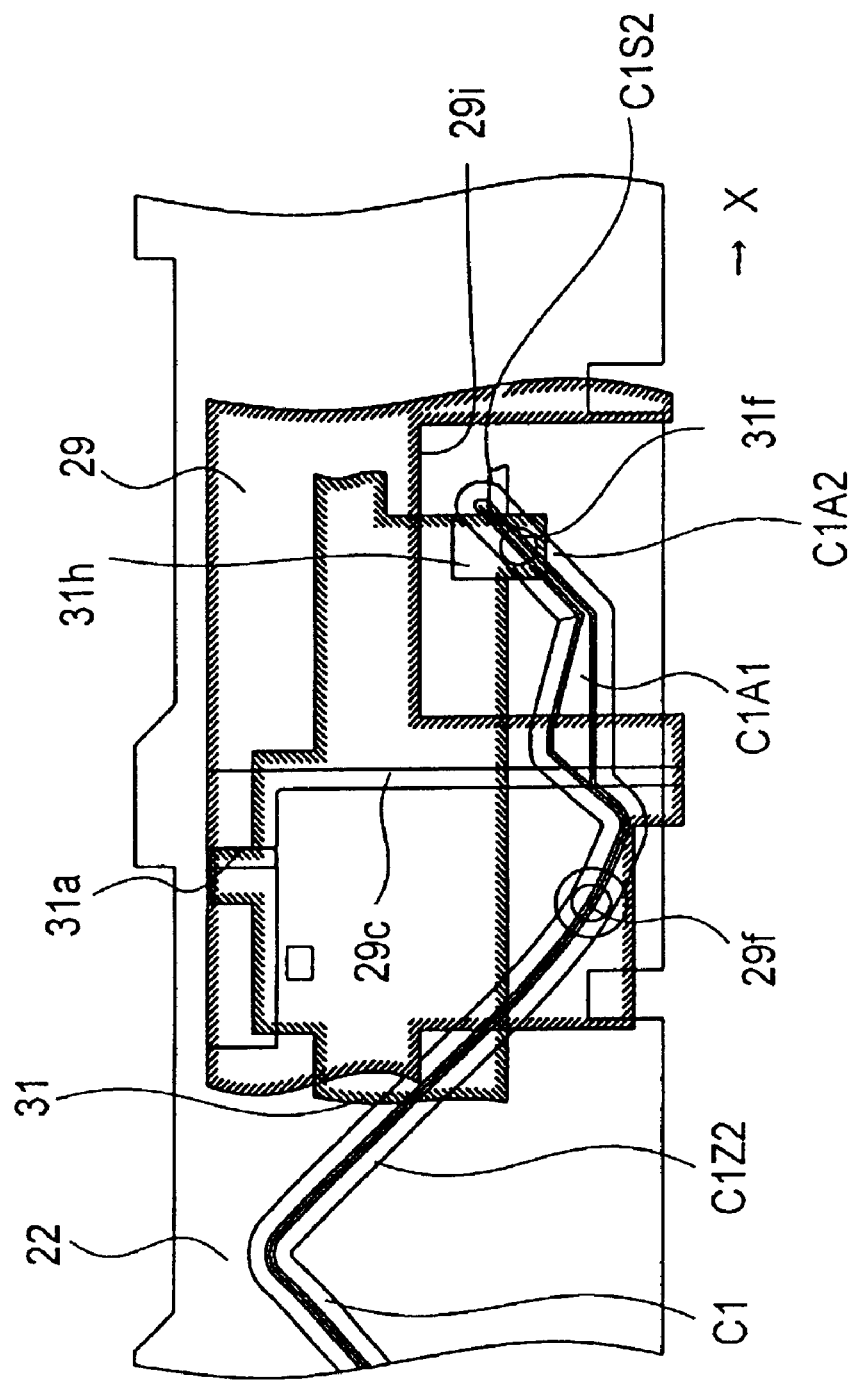

Further rotational movement of the cam ring 22 in the same direction X causes each follower pin 29*f* of the first lens group moving frame 29 to move forward in the second-lens-group zooming section C1Z2 in a left oblique direction with respect to the cam ring 22 as viewed in FIG. 21E, so that the three cutout portions 29*i* are respectively disengaged from the three engaging projections 31*h*, and at the same time, rear end surfaces of the three circumferential recesses 29*h* respectively come into contact with rear end surfaces of the three linear guide keys 31*a* as shown in FIG. 21E.

Figure 21F:
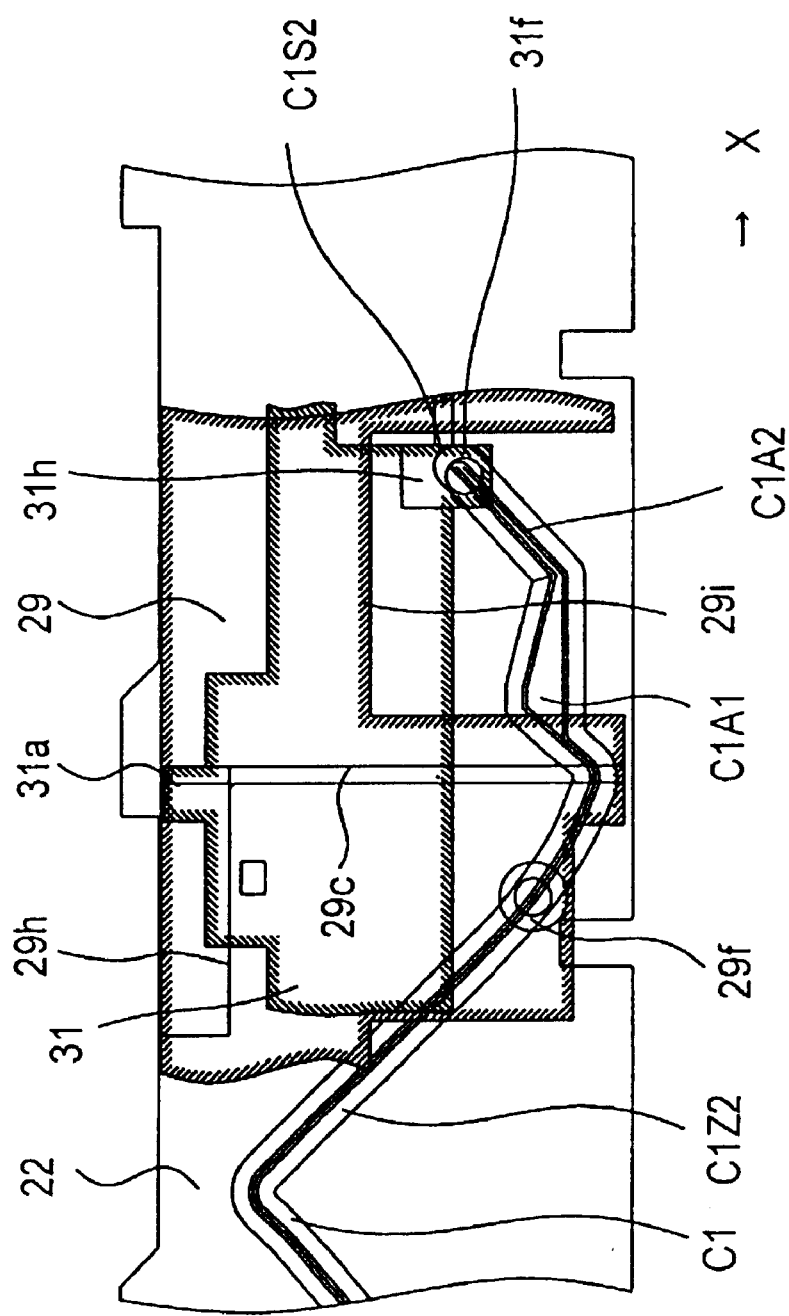

Further rotational movement of the cam ring 22 in the same direction X causes each follower pin 29*f* of the first lens group moving frame 29 to further move forward in the second-lens-group zooming section C1Z2 in the same left oblique direction with respect to the cam ring 22 so that the rear end surfaces of the three circumferential recesses 29*h* respectively press the rear end surfaces of the three linear guide keys 31*a* rearward in the optical axis direction, to thereby move each follower pin 31*f* of the second lens group moving frame 31 in the connecting portion C1A2 back toward the second-lens-group-accommodation end portion C1S2 thereof as shown in FIG. 21F. At this time, each linear guide keys 31*a* of the second lens group moving frame 31 is positioned in the associated linear guide groove 29*c* of the first lens group moving frame 29 in the vicinity of the front end thereof.

During the time the zoom lens barrel 10 moves from the position shown in FIG. 21A to the position shown in FIG. 21F, each linear guide keys 31*a* of the second lens group moving frame 31 rotates in the associated circumferential recess 29*h* in a circumferential direction of the first lens group moving frame 29 with respect to the first lens group moving frame 29. Rotating the second lens group moving frame 31 with respect to the first lens group moving frame 29 in such a manner makes it possible for the first lens group moving frame 29 to move forward smoothly without interfering with the second lens group moving frame 31. The second lens group moving frame 31 rotates about the optical axis O with respect to the first lens group moving frame 29 by 39 degrees (see FIG. 20) when the zoom lens barrel 10 moves from the position shown in FIG. 21A to the position shown in FIG. 21F.

Further rotational movement of the cam ring 22 in the same direction X causes each follower pin 29*f* of the first lens group moving frame 29 to further move forward in the second-lens-group zooming section C1Z2 in the same left oblique direction with respect to the cam ring 22 so that each linear guide keys 31*a* of the second lens group moving frame 31 is properly engaged in the associated linear guide groove 29*c* as shown in FIG. 21G. Thereafter, the first lens group moving frame 29 and the second lens group moving frame 31 are prohibited from rotating relative to each other, while each follower pin 29f and the associated one of the three follower pins 31f move in the associated one of the three lens-drive cam grooves C1 in a direction to the left as viewed in FIG. 21G while maintaining a space between the follower pin 29f and the follower pin 31f in a circumferential direction.

Figure 21I:
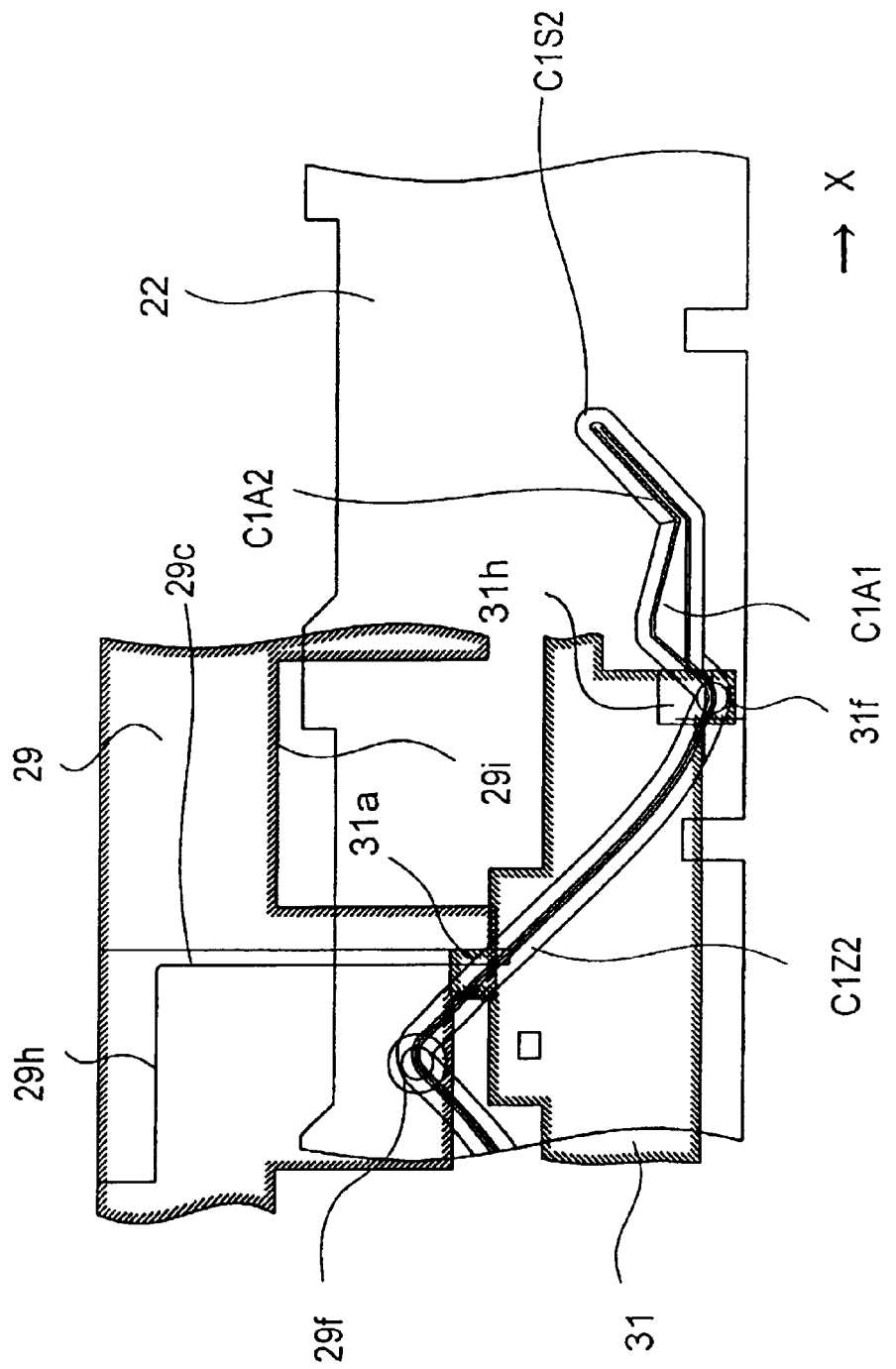
Figure 21J:
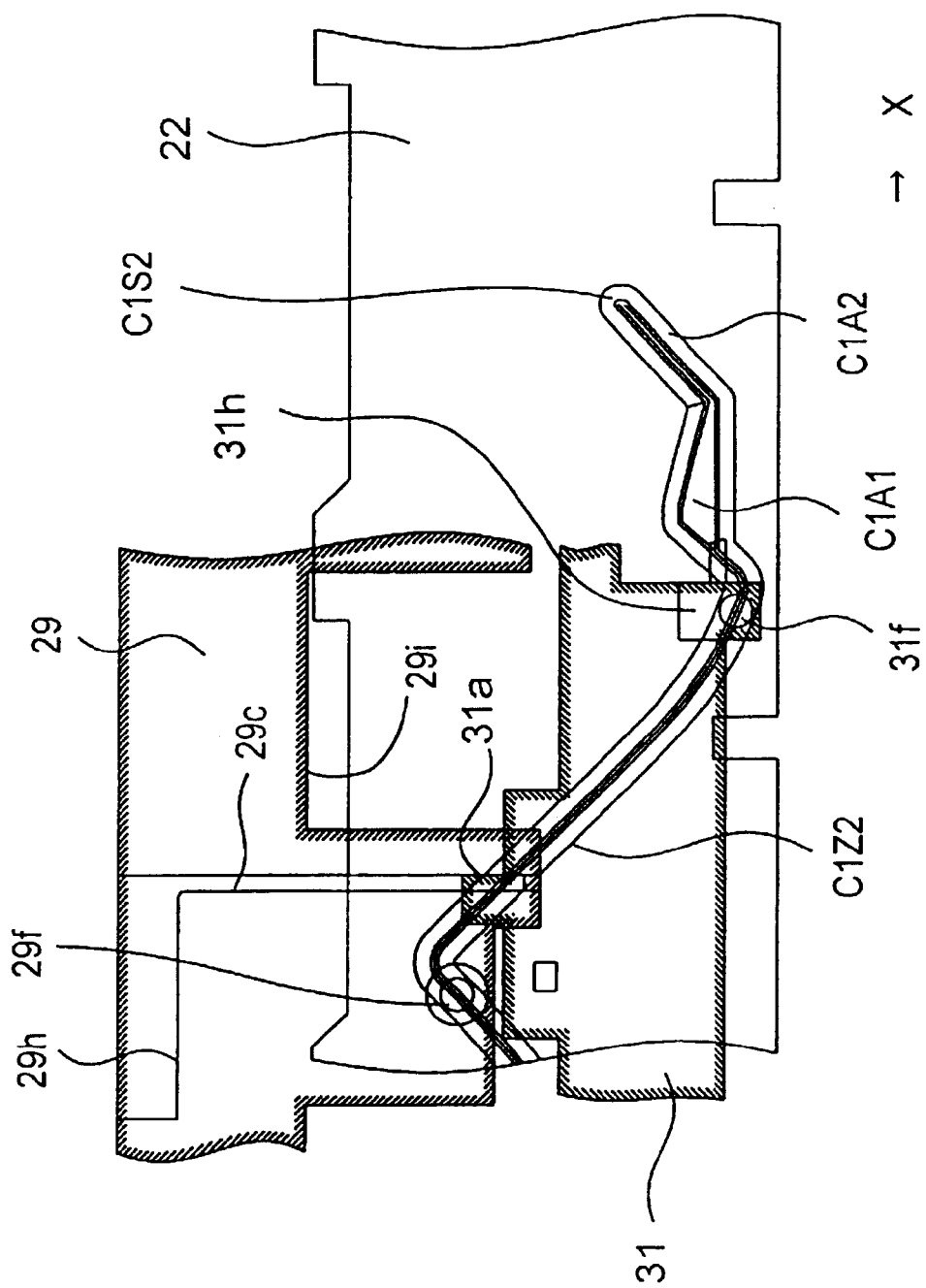

Subsequently, if the cam ring 22 continues to rotate in the direction X with each linear guide keys 31a of the second lens group moving frame 31 being engaged in the associated linear guide groove 29c of the first lens group moving frame 29, the first lens group moving frame 29 and the second lens group moving frame 31 move linearly in the optical axis direction without rotating about the optical axis O while changing a space in the optical axis therebetween by the movement of the three follower pins 29f and the three follower pins 31f in the three lens-drive cam grooves C1 in a direction toward the left as shown in FIGS. 21H through 21I. Consequently, each follower pin 29f and the associated one of the three follower pins 31f reach their respective wide-angle extremities in the associated one of the three lens-drive cam grooves C1 as shown in FIG. 21J.

Although not shown in the drawings, each follower pin 29f and the associated one of the three follower pins 31f reach their respective telephoto extremities in the associated one of the three lens-drive cam grooves C1 while maintaining a space therebetween in a circumferential direction if the cam ring 22 further continues rotating in the same direction X.

On the other hand, in a state where the zoom lens barrel 10 is in a photographing position, if the cam ring 22 rotates in a direction to retract the zoom lens barrel 10, i.e., in a direction opposite to the direction X, each follower pin 29f and each follower pin 31f move in an order reverse to the above described order, and return to the first-lens-group accommodation portion C1A1 and the connecting portion C1A2, respectively.

Figure 22:
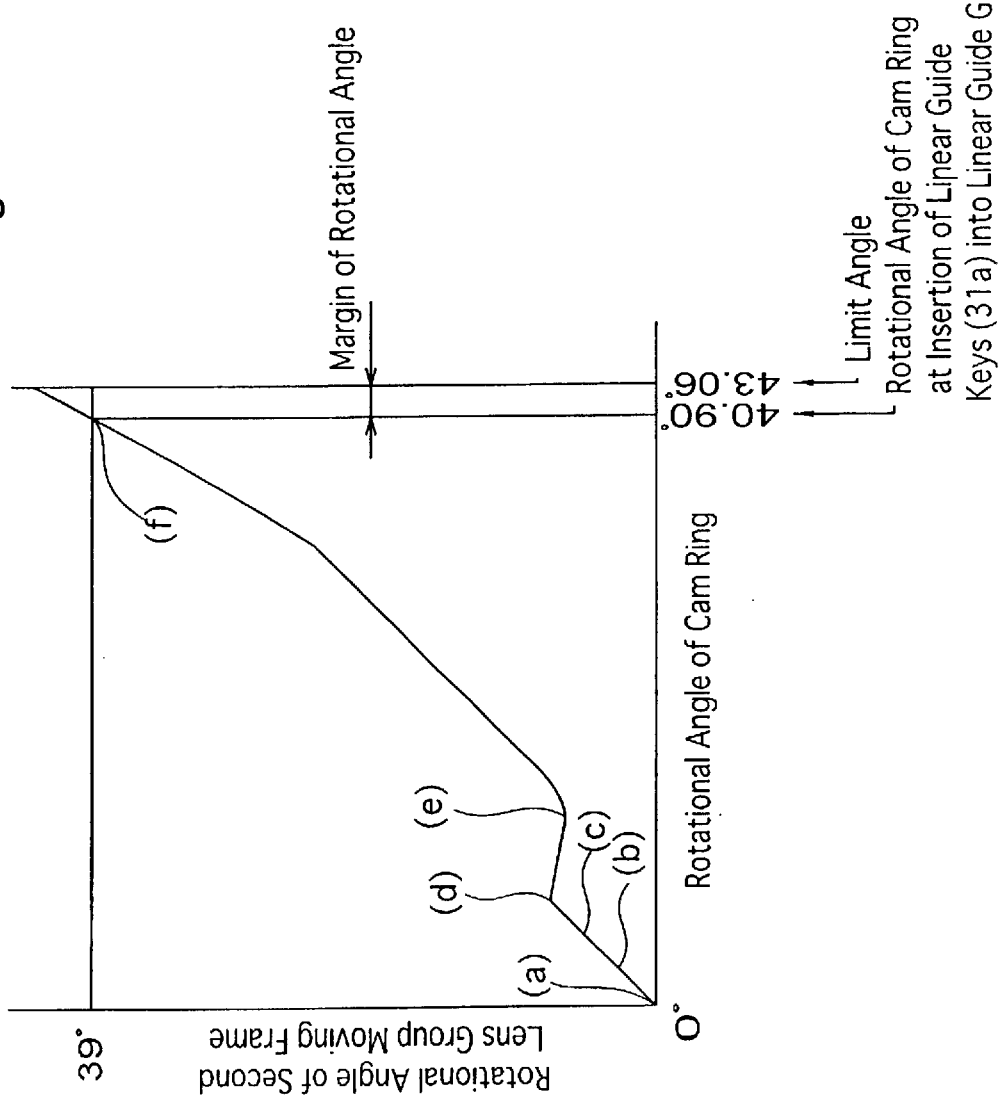
FIG. 22 is a graph showing variations in angle of rotation of the second lens group moving frame with respect to the cam ring.
Figure 23:
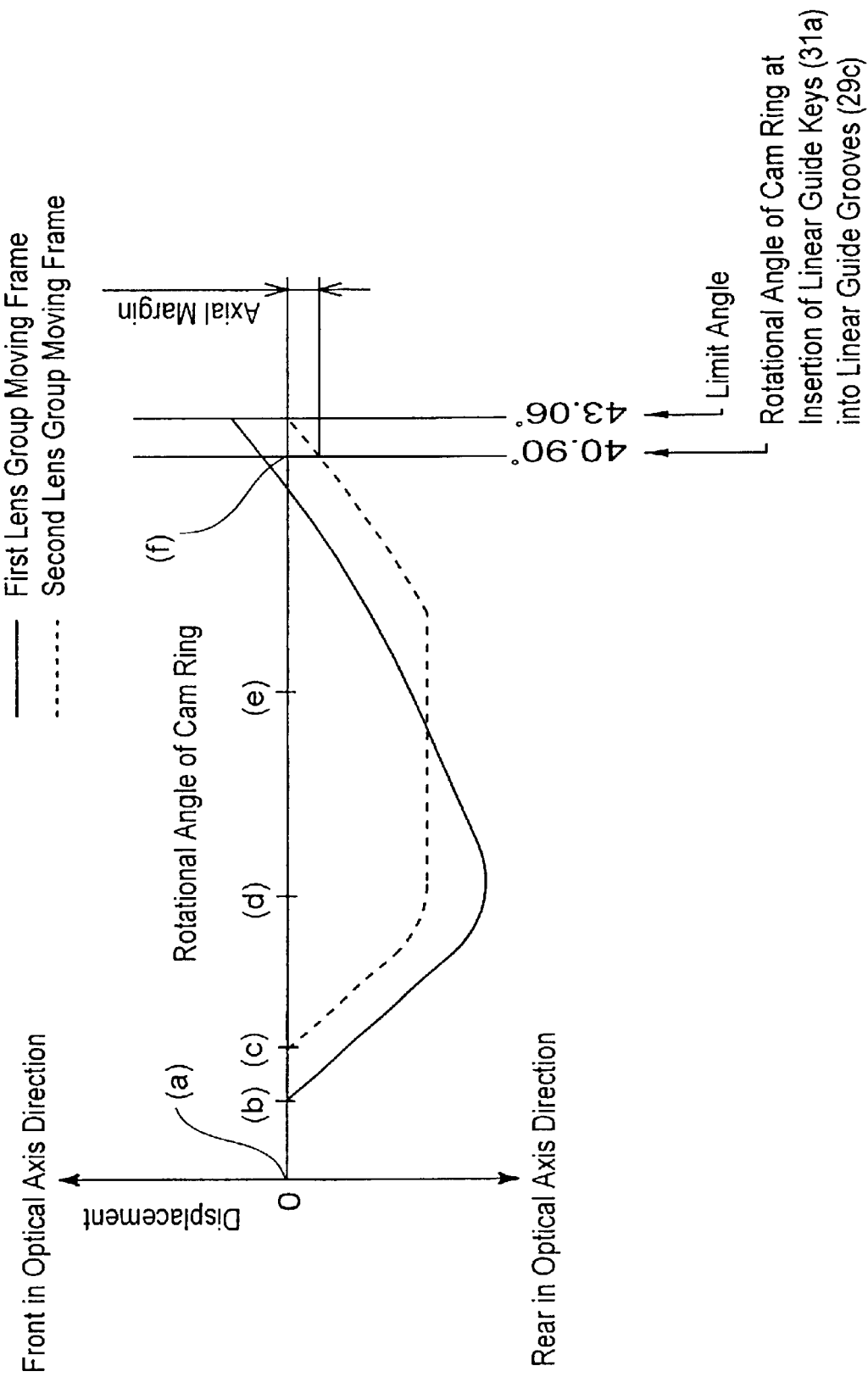
FIG. 23 is a graph showing the relationship among the angle of rotation of the cam ring and the axial positions of the first and second lens group moving frames, wherein their respective accommodation positions are represented by the point of origin (zero) of the graph.

FIG. 22 is a graph showing variations of the angle of rotation of the second lens group moving frame 31 with respect to the cam ring 22 from a state where the second lens group moving frame 31 is in an accommodation position to a state immediately after the three linear guide keys 31a are respectively engaged in the three linear guide grooves 29c, i.e., from the position shown in FIG. 21A to the position shown in FIG. 21F. FIG. 23 is a graph showing the relationship between the amount of displacement of the first lens group moving frame 29 from the accommodation position thereof (represented by "0" in FIG. 23) in the optical axis direction and the angle of rotation of the cam ring 22, and further showing the relationship between the amount of displacement of the second lens group moving frame 31 from the accommodation position thereof (represented by "0" in FIG. 23) in the optical axis direction and the angle of rotation of the cam ring 22. In each of FIGS. 22 and 23, (a), (b), (c), (d), (e) and (f) represent the rotational angles of the cam ring 22 in FIGS. 21A, 21B, 21C, 21D, 21E and 21F, respectively. The term "Limit Angle" shown in each of FIGS. 22 and 23 represents a specific angle of rotation of the cam ring 22, wherein the first and second lens group moving frames 29 and 31 cannot reach their respective telephoto extremities when the three linear guide keys 31a do not enter the associated linear guide groove 29c by the time the cam ring 22 has rotated to the specific angle of rotation of the cam ring 22.

When the first and second lens group moving frames 29 and 31 rotate relative to each other at their respective accommodation positions, friction (frictional resistance) is produced between the lens pressure ring 32a, which is supported by the first lens group moving frame 29, and the front surface of the shutter pressure plate 37, which is supported by the second lens group moving frame 31 via the shutter unit 36, if a low-frictional element such as the low-frictional ring sheet 38 is not fixed to the front surface of the shutter pressure plate 37, unlike the present invention. Namely, there is a possibility of the axial position of the first lens group supporting frame 32 deviating from the correct position thereof due to rotation thereof which can be caused by friction since the first lens group supporting frame 32 is coupled to the first lens group moving frame 29 via the thread engagement of the male thread portion of the first lens group supporting frame 32 with the female thread portion 29d of the inner flange 29g of the first lens group moving frame 29. Nevertheless, in the present embodiment of the zoom lens barrel, such friction is not produced even if the first and second lens group moving frames 29 and 31 rotate relative to each other at their respective accommodation positions because the low-frictional ring sheet 38 is fixed to the front surface of the shutter pressure plate 37.

The overall movement of the zoom lens barrel 10, having the above described structure, from the accommodation position to a photographing position (a position in the zooming section) will be hereinafter discussed.

When the zoom lens barrel 10 is in an accommodation position, the first lens group supporting frame 32 which is supported by the first lens group moving frame 29, which is biased rearward by the three helical compression springs 30, is retracted to the above described mechanically contacting point P, where the lens pressure ring 32a comes in contact with the low-frictional ring sheet 38 due to the clearance between the first-lens-group accommodation portion C1A1 and the associated follower pin 29f of the first lens group moving frame 29. The second lens group moving frame 31 is also retracted to the above described mechanically contacting point Q, where the second lens group moving frame 31 comes in contact with the third lens frame 39 due to the clearance between the second-lens-group-accommodation end portion C1S2 and the associated follower pin 31f of the second lens group moving frame 31. Furthermore, the third lens frame 39 is retracted to the above described mechanically contacting point R, where the third lens frame 39 comes in contact with the CCD holding frame 13 against the spring force of the helical compression spring 42 with the helical compression spring 42 being in a compressed (contracted) state. With these three mechanical contacts at the mechanically contacting points P, Q and R, the length of the zoom lens barrel 10 in an accommodation position is successfully reduced. When the zoom lens barrel 10 is in an accommodation position, the pair of barrier blades 46 are closed to shut the photographing aperture 45a, since the three rotation transfer faces 22d respectively press the three engaging portions 44a of the barrier drive ring 44 against the spring force of the helical extension spring 49 to rotate the barrier drive ring 44 in a direction to move the two drive projections 44c away from the two engaging projections 46a of the pair of barrier blades 46, respectively.

In the accommodation position of the zoom lens barrel 10, when the rotational ring 20 rotates in a direction to extend the zoom lens barrel 10 relative to the stationary barrel 11, the cam ring 22, which is provided with the three follower pins 22f, and the biasing ring 21, which is provided with the three follower pins 21f, rotate about the optical axis O in accordance with the cam profile of the accommodation groove portion 11a2 of each of the three cam grooves 11a that are formed on an inner peripheral surface of the stationary barrel 11 (see FIG. 28). This rotational movement of the cam ring 22 causes each follower pin 29f and the associated follower pin 31f, which are respectively engaged in the first-lens-group accommodation portion C1A1 of the associated lens-drive cam groove C1 and the second-lens-group-accommodation end portion C1S2 of the same lens-drive cam groove C1, to vary the relative position between the follower pin 29f and the follower pins 31f in a circumferential direction of the cam ring 22 without varying the position of each of the follower pin 29f and the follower pins 31f relative to the cam ring 22 in the optical axis direction (see the transition from (a) to (b) in FIG. 23). Thereafter, each follower pin 21f of the biasing ring 21 and each follower pin 22f of the cam ring 22 enter the position-changing groove portion 11a3, so that the cam ring 22 together with the biasing ring 21 moves forward in the optical axis direction while rotating about the optical axis O. This causes the second lens group moving frame 31 to disengage from the third lens frame 39, and almost at the same time, each follower pin 29f of the first lens group moving frame 29 starts moving rearward in the optical axis direction with respect to the cam ring 22 (see (b) in FIG. 23). As a result, the first lens group moving frame 29 presses the second lens group moving frame 31 rearward in the optical axis direction to move the second lens group moving frame 31 slightly in the rearward direction. The displacement of the second lens group moving frame 31 at this time is very small, and thus is not shown in FIG. 23. In an early stage of this rotation of the cam ring 22 by the position-changing groove portions 11a3 of the stationary barrel 11, the three rotation transfer faces 22d of the cam ring 22 are respectively disengaged from the three engaging portions 44a of the barrier drive ring 44 so that the barrier drive ring 44 is rotated in a direction to open the pair of barrier blades 45 by the spring force of the helical extension spring 49 against the spring force of the two torsion springs 47. Meanwhile, the second lens group moving frame 31 rotates about the optical axis O relative to the first lens group moving frame 29 so that the lens pressure ring 32a fixed to the first lens group supporting frame 32 rotatably slides on the low-frictional ring sheet 38 before and after the opening operation of the pair of barrier blades 46.

Subsequently, further forward movement of each follower pin 21f of the biasing ring 21 and each follower pin 22f of the cam ring 22 in the position-changing groove portion 11a3 (see FIG. 28) causes the second lens group moving frame 31 to start moving rearward in the optical axis direction (see (c) in FIG. 23). Thereafter, the first and second lens group moving frames 29 and 31 move rearward in the optical axis direction with respect to the cam ring 22 as shown in FIG. 23 (see (c) and (d) in FIG. 23). Subsequently, the mechanical contact between the first and second lens group moving frames 29 and 31 is released at the time the first lens group moving frame 29 moves forward in the optical axis direction (see (d) and (e) in FIG. 23). Subsequently, the mechanical contact between the second lens group moving frame 31 and the third lens frame 39 is released, and thereafter each of the three linear guide keys 31a is engaged in the associated one of the four linear guide grooves 29c (see (f) in FIG. 23).

Thereafter, the first and second lens group moving frames 29 and 31 move to the respective wide-angle extremities thereof in the optical axis direction while maintaining the circumferential space therebetween until each follower pin 21f and each follower pin 22f reach the respective wide-angle extremities thereof in the zooming groove portion 11a4 of the associated one of the three cam grooves 11a that are formed on the inner peripheral surface of the stationary barrel 11 (see FIGS. 21F through 21J).

Further rotation of the rotational ring 20 causes each follower pin 21f of the biasing ring 21 and each follower pin 22f of the cam ring 22 to move from the respective wide-angle extremities in the zooming groove portion 11a4 toward the respective telephoto extremities, so that the cam ring 22 rotates about the optical axis O without moving in the optical axis direction. At this stage, if the cam ring 22 rotates in the zooming range (i.e., if each follower pin 29f and each follower pin 31f move in the first-lens-group zooming section C1Z1 and the second-lens-group zooming section C1Z2, respectively), the first and second lens group moving frames 29 and 31 (the first and second lens groups L1 and L2) move in the optical axis direction in accordance with the cam profiles of the first-lens-group zooming section C1Z1 and the second-lens-group zooming section C1Z2, to thereby vary the focal length of the photographing optical system, i.e., to perform a zooming operation. This zooming operation is carried out by manually operating a conventional zoom switch or knob (not shown). Immediately after a release button is depressed, the aforementioned step motor (not shown), which drives the feed screw shaft 41 to move the third lens group L3 (the third lens frame 39), rotates by an amount of rotation corresponding to information on a photographing distance to move the third lens group L3 to bring an object into focus. The shutter unit 36 drives the shutter blades 36a (see FIGS. 8, 9 or 10) to open and close in accordance with the information on the object brightness.

Backlash and play between the three follower pins 21f of the biasing ring 21, the three follower pins 22f of the cam ring 22 and the zooming groove portions 11a4 of the three cam grooves 11a of the stationary barrel 11 are removed at the time the motor 18 stops during the time each of the three follower pins 21f and the associated one of the three follower pins 22f are moving in the zooming groove portion 11a4 of the associated one of the three cam grooves 11a, since each follower pin 21f of the biasing ring 21 and the associated one of the three follower pins 22f of the cam ring 22 are pressed against a rear side edge of the associated cam groove 11a and a front side edge of the same cam groove 11a, respectively, over the full range of the cam groove 11a by the spring force of the three compression helical springs 26 as described above.

When the first lens group moving frame 29 moves linearly in the optical axis direction, the first ring 28 also moves in the optical axis direction without varying the position thereof relative to the first lens group moving frame 29 due to the engagement of the three follower pins 28f with the three cam grooves C2 of the cam ring 22, the profiles of which are similar to those of the lens-drive cam grooves C1. At the same time, the first ring 28 and the second ring 27, the respective outer peripheral surfaces of which are exposed to the outside of the zoom lens barrel 10, move together in the optical axis direction since the second ring 27 moves together with the cam ring 22 in the optical axis direction at all times due to the engagement of the three bayonet prongs 27c of the second ring 27 with the three bayonet prongs 24 of the cam ring 22.

On the other hand, when the cam ring 22 rotates in a direction from the zooming section via the preparation section (i.e., in the barrier closing direction), the first and second rings 28 and 27 retract together in the optical axis direction by operations reverse to the above described operations. Subsequently, the first lens group moving frame 29, which supports the first lens group L1, and the second lens group moving frame 31, which supports the second lens group L2, come into contact with each other at their respective rear ends via the three helical compression springs 30. Subsequently, the second lens group moving frame 31 retreats until coming into contact with the third lens frame 39. Subsequently, the second lens group moving frame 31 further retreats until the third lens frame 39 comes into contact with the CCD holding frame 13 against the spring force of the helical compression spring 42, which biases the third lens frame 39 forward. At the same time, the three rotation transfer faces 22d respectively press the three engaging portions 44a of the barrier drive ring 44 against the spring force of the helical extension spring 49 to rotate the barrier drive ring 44 in a direction to close the pair of barrier blades 46 to shut the photographing aperture 45a.

In the present embodiment of the zoom lens barrel 10, as described above, the cam ring 22 rotates about the optical axis O by 40.90 degrees while the second lens group moving frame 31 rotates about the optical axis O by 39 degrees (see FIG. 22) by making each follower pin 31f of the second lens group moving frame 31, which is engaged in the second-lens-group-accommodation end portion C1S2 of the connecting portion C1A2, rotate about the optical axis O together with the cam ring 22 (see FIGS. 21A and 21B) while making each follower pin 31f which has moved from the second-lens-group-accommodation end portion C1S2 toward the first-lens-group accommodation portion C1A1 move back to the second-lens-group-accommodation end portion C1S2 (see FIGS. 21E and 21F).

With this structure, the length of each lens-drive cam groove C1 has been successfully reduced by a length corresponding to the rotational angle of the second lens group moving frame 31 by 39 degrees and a large angle of rotation of the cam ring 22 has been achieved (178 degrees in this particular embodiment), as compared with the case where the second lens group moving frame 31 cannot be rotated about the optical axis O. Accordingly, the three lens-drive cam grooves C1 do not interfere with one another even if the angle of inclination of each lens-drive cam groove C1 relative to a circumferential direction of the cam ring 22 is reduced to achieve a smooth movement of each of the first and second lens group moving frames 29 and 31.

Moreover, due to the large angle of rotation of the cam ring 22, each follower pin 29f and each follower pin 31f can be moved in the associated lens-drive cam groove C1 of the cam ring 22 with precision, stable movement of the follower pins 29f and 31f are ensured, and restrictions on the optical design of the zoom lens barrel 10 are eased. This makes it easy to design a complicated optical system of the zoom lens barrel 10.

As shown in FIGS. 21A through 21F, the three lens-drive cam grooves C1 are formed on the cam ring 22 so that the second lens group moving frame 31 (follower pins 31f) does not move forward (toward the object side) from the accommodation position thereof with respect to the cam ring 22 in the optical axis direction when the cam ring 22 rotates to make the zoom lens barrel 10 extend from the accommodation position to the wide-angle extremity (i.e., when each linear guide key 31a is moved in the associated circumferential recess 29h in a circumferential direction of the first lens group moving frame 29). Accordingly, the connecting portion C1A2 can be formed to extend directly from the accommodation position of the associated follower pin 31f (i.e., the second-lens-group-accommodation end portion C1S2). This makes it possible to reduce the length of each lens-drive cam groove C1, i.e., to increase the angle of rotation of the second lens group moving frame 31 between the accommodation position and the wide-angle extremity.

In the present embodiment of the zoom lens barrel 10, the length of the zoom lens barrel 10 in the accommodation position can be reduced due to the first lens group moving frame 29 positioned in the accommodation position being able to be moved rearward since the first-lens-group accommodation portion C1A1 is shaped to allow the associated follower pin 29f of the first lens group moving frame 29 to move in the optical axis direction in the front-lens-group accommodation section (C1A1) by a predetermined amount of movement. In addition, the length of the zoom lens barrel in an accommodation state can be reduced also due to the three circumferential slots 29j being formed on the inner flange 29g of the first lens group moving frame 29 and since the three front projecting portions 31g, which are formed at the front end of the second lens group moving frame 31, extend through the inner flange 29g of the first lens group moving frame 29 to project forward from the inner flange 29g through the three circumferential slots 29j, respectively, when each linear guide key 31a is positioned in the associated circumferential recess 29h, i.e., when the second lens group L2 is in the vicinity of the accommodation position thereof.

The present invention can be applied not only to a zoom lens barrel but also to a fixed-focal-length lens barrel.

As can be understood from the above description, a large angle of rotation of the cam ring is achieved even if the cam grooves formed on the cam ring are shortened.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A lens barrel comprising:

an optical system including a front lens group and a rear lens group;

a front lens frame which supports said front lens group, said front lens frame including a first cam follower and being guided linearly in an optical axis direction without rotating about said optical axis;

a rear lens frame which supports said rear lens group and includes a second cam follower; and a cam ring which is driven to rotate about said optical axis and includes a cam groove in which said first cam follower and said second cam follower are engaged;

wherein said cam groove of said cam ring includes a front-lens-group accommodation portion which accommodates said first cam follower, and a rear-lens-group-accommodation portion which accommodates said second cam follower and is positioned closer to the front side of said cam ring than said front-lens-group accommodation portion, said front lens group and said rear lens group being positioned in respective accommodation positions thereof when said first cam follower and said second cam follower are engaged in said front-lens-group accommodation portion and said rear-lens-group-accommodation portion, respectively;

wherein one of said front lens frame and said rear lens frame includes a linear guide groove which extends parallel to said optical axis and a wide-width engaging portion which communicatively connects to a front end of said linear guide groove, said wide-width engaging portion having a greater width than said linear guide groove in a circumferential direction of said one of said front lens frame and said rear lens frame;

wherein the other of said front lens frame and said rear lens frame includes a linear guide projection which is selectively engaged in one of said linear guide groove and said wide-width engaging portion;

wherein said cam groove of said cam ring further includes a straight connecting portion formed so as to extend between said front-lens-group accommodation portion and said rear-lens-group-accommodation portion to extend linearly in a direction inclined with respect to both said optical axis and a circumferential direction of said cam ring, a width of said straight connecting portion being substantially the same as a diameter of said second cam follower;

wherein said rear-lens-group-accommodation portion is formed as a dead end of said cam groove which only allows said second cam follower to move toward said straight connecting portion therefrom;

wherein said linear guide projection is engaged in said wide-width engaging portion to thereby allow said rear lens frame to rotate with respect to said front lens frame when said front lens group and said rear lens group are positioned in said respective accommodation positions;

wherein in the case where said cam ring rotates when said front lens group and said rear lens group are positioned in said respective accommodation positions, said second cam follower is rotated together with said cam ring, said second cam follower being positioned in one of said rear-lens-group-accommodation portion and said straight connecting portion in the vicinity of said rear-lens-group-accommodation portion when said linear guide projection reaches said front end of said linear guide groove from said wide-width engaging portion to be thereby prevented from rotating with respect to said front lens frame; and wherein said second cam follower is moved on a side edge of said straight connecting portion toward said front-lens-group accommodation portion so that said linear guide projection enters said linear guide groove to be properly engaged therein after said linear guide projection reaches said front end of said linear guide groove from said wide-width engaging portion.

2. The lens barrel according to claim 1, wherein said cam groove comprises a moving section which is connected to one end portion of said front-lens-group accommodation portion on the side opposite from said straight connecting portion, said moving section being inclined in an opposite direction to the inclination direction of said straight connecting portion;

wherein, when said second cam follower is moved rearward in said straight connecting portion so that said linear guide projection enters said linear guide groove, said first cam follower is moved forward in said moving section to move said front lens frame forward in the optical axis direction.

3. The lens barrel according to claim 2, wherein said lens barrel comprises a zoom lens barrel; and wherein said moving section constitutes a zooming section for moving said front lens group and said rear lens group to perform a zooming operation.

4. The lens barrel according to claim 1, wherein said cam groove comprises a moving section for moving said first cam follower and said second cam follower to move said front lens frame and said rear lens frame in said optical axis direction, said moving section being connected to one end portion of said front-lens-group accommodation portion on the side opposite from said straight connecting portion;

wherein said moving section is curved to extend firstly rearward and subsequently forward, from said front-lens-group accommodation portion;

wherein said front lens frame presses said rear lens frame rearward to move said second cam follower from said rear-lens-group-accommodation portion to said straight connecting portion when said first cam follower moves rearward from said front-lens-group accommodation portion to said moving section by rotation of said cam ring; and wherein, when said first cam follower subsequently moves forward in said moving section, said front lens frame presses said rear lens frame forward to move said second cam follower in said straight connecting portion back toward said rear-lens-group-accommodation portion, said linear guide projection reaching said front end of said linear guide groove from said wide-width engaging portion before said second cam follower reaches said rear-lens-group-accommodation portion.

5. The lens barrel according to claim 4, wherein said second follower pin stays in said rear-lens-group-accommodation portion and rotates together with said cam ring without moving relative to said rear-lens-group-accommodation portion during the time said first cam follower moves from said front-lens-group accommodation portion to said moving section.

6. The lens barrel according to claim 4, wherein said wide-width engaging portion and said linear guide groove are formed on an inner peripheral surface of said front lens frame;

wherein said linear guide projection is formed on an outer peripheral surface of said rear lens frame; and wherein a rear side edge of said wide-width engaging portion presses said linear guide projection forward when said first cam follower moves forward in said moving section.

7. The lens barrel according to claim 4, wherein said lens barrel comprises a zoom lens barrel; and wherein said moving section constitutes a zooming section for moving said front lens group and said rear lens group to perform a zooming operation.

8. The lens barrel according to claim 1, wherein said front-lens-group accommodation portion is shaped to allow said first cam follower to move in said optical axis direction in said front-lens-group accommodation portion by a predetermined amount of movement.

9. The lens barrel according to claim 1, wherein said front lens frame comprises an inner flange for supporting said front lens group, a circumferential opening being formed on said inner flange; and wherein said rear lens frame comprises a front projecting portion, on which said linear guide projection is formed, said front projecting portion projecting forward to extend through said inner flange through said circumferential opening when said rear lens frame is positioned in the vicinity of said accommodation position thereof.

10. A lens barrel comprising:

an optical system including a front lens group and a rear lens group;

a front lens frame which supports said front lens group, said front lens frame including a first cam follower and being guided linearly in an optical axis direction without rotating about said optical axis;

a rear lens frame which supports said rear lens group and includes a second cam follower; and a cam ring which is driven to rotate about said optical axis and includes a cam groove in which said first cam follower and said second cam follower are engaged;

wherein said cam groove of said cam ring includes a front-lens-group accommodation portion which accommodates said first cam follower, and a rear-lens-group-accommodation portion which accommodates said second cam follower, said front lens group and said rear lens group being positioned in respective accommodation positions thereof when said first cam follower and said second cam follower are engaged in said front-lens-group accommodation portion and said rear-lens-group-accommodation portion, respectively;

wherein said cam groove further includes a straight connecting portion formed so as to extend between said front-lens-group accommodation portion and said rear-lens-group-accommodation portion to extend linearly in a direction inclined with respect to both said optical axis and a circumferential direction of said cam ring, a width of said straight connecting portion being substantially the same as a diameter of said second cam follower;

wherein said rear-lens-group-accommodation portion is formed as a dead end of said cam groove which only allows said second cam follower to move toward said straight connecting portion therefrom;

wherein one of said front lens frame and said rear lens frame includes a linear guide groove which extends parallel to said optical axis and a wide-width engaging portion which communicatively connects to a front end of said linear guide groove, said wide-width engaging portion having a greater width than said linear guide groove in a circumferential direction of said front lens frame and said rear lens frame;

wherein the other of said front lens frame and said rear lens frame includes a linear guide projection which is selectively engaged in one of said linear guide groove and said wide-width engaging portion;

wherein said second cam follower is positioned in said rear-lens-group-accommodation portion when said rear lens frame is positioned at one end of a rotational range thereof which is determined by an engagement of said linear guide projection with said wide-width engaging portion; and wherein said second cam follower is positioned in one of said rear-lens-group-accommodation portion and said straight connecting portion in the vicinity of said rear-lens-group-accommodation portion when said rear lens frame is positioned at the other end of said rotational range thereof.

* * * * *